United States Patent [19]

Murata et al.

[11] Patent Number: 5,152,918
[45] Date of Patent: Oct. 6, 1992

[54] LIQUID CRYSTAL-ALIGNING COATING AND A LIQUID CRYSTAL DISPLAY ELEMENT

[75] Inventors: Shizuo Murata; Minoru Nakayama, both of Ichiharashi; Kenji Furukawa, Yokosukashi; Ryuji Kobayashi, Yokohamashi, all of Japan

[73] Assignee: Chisso Corporation, Osaka, Japan

[21] Appl. No.: 473,836

[22] Filed: Feb. 2, 1990

[30] Foreign Application Priority Data

Feb. 9, 1989 [JP] Japan .................................. 1-30861
Nov. 22, 1989 [JP] Japan .................................. 1-303710

[51] Int. Cl.$^5$ .................... C09K 19/56; G02F 1/13; C08G 73/06; C08G 73/10
[52] U.S. Cl. ................................ 252/299.4; 359/75; 528/314; 528/320; 528/322; 528/423; 528/424
[58] Field of Search ................... 252/299.01, 299.4; 359/75, 76; 564/322, 417, 418, 323; 528/314, 320, 322, 423, 424

[56] References Cited

U.S. PATENT DOCUMENTS

| | | | |
|---|---|---|---|
| 4,405,208 | 9/1983 | Shirai | 359/75 |
| 4,494,824 | 1/1985 | Nakamura et al. | 359/75 |
| 4,749,777 | 6/1988 | Kohtoh et al. | 252/299.01 |
| 4,879,059 | 11/1989 | Hanya et al. | 252/299.4 |
| 5,008,456 | 4/1991 | Murata et al. | 252/299.4 |

FOREIGN PATENT DOCUMENTS 0219336  4/1987  European Pat. Off. .

OTHER PUBLICATIONS

Reviews in Macromolecular Chemistry, vol. 12, 1974/1975, pp. 101-129 Korshak et al., "Cardo polymers".

Primary Examiner—Robert L. Stoll
Assistant Examiner—Shean C. Wu
Attorney, Agent, or Firm—Fleit, Jacobson, Cohn, Price, Holman & Stern

[57] ABSTRACT

An improved liquid crystal-aligning coating composed mainly of a specified high molecule, mainly a polyether polyimide or a polyimide, and capable of controlling the alignment and pretilt angle of liquid crystals; a liquid crystal display element using the coating; and a dinitro compound and a diol compound each as an intermediate of a diamino compound constituting the polyimide ether, are provided, which specified high molecule contains in its molecular long chain, a substituted cyclohexylidene group or a cyclohexylidene group expressed by the formula

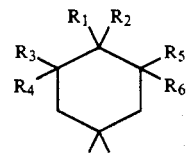

wherein $R_1$ to $R_6$ of the cyclohexyl group each represent H, 1-15C alkyl group, a cyclohexyl group or a cyclohexyl group having 1-15C alkyl group, and may be each the same or partly or totally different.

12 Claims, 3 Drawing Sheets

LIQUID CRYSTAL-ALIGNING COATING AND A LIQUID CRYSTAL DISPLAY ELEMENT

BACKGROUND OF THE INVENTION
1. Field of the Invention

This invention relates to an improvement in a polyether imide or polyimide liquid crystal-aligning coating capable of controlling the alignment and pretilt angle of liquid crystals.

Further, the present invention relates to a novel diamino compound useful as a raw material of a polyimide for the aligning coating for liquid crystal display elements affording a large pretilt angle, and a dinitro compound and diol compound each as an intermediate for the diamino compound.

2. Description of the Related Art

As to conventional liquid crystal display elements used for watches, electronic calculator, etc., twisted nematic (hereinafter abbreviated to TN) mode having a structure wherein the aligning direction of nematic liquid crystal molecules is twisted by 90° on the surfaces of a pair of two upper and lower electrode substrates has been mainly employed. However, as to such a display mode, at the time of a high duty drive, the contrast is low and the viewing angle is narrow due to cross-talk; hence the mode has been insufficient for improving the display quality and display area. In recent years, a liquid crystal display device making use of a super twisted birefringence effect has been announced (T. J. Scheffer and J. Nehring, Appl. Phys. Lett, 45 (10), 1021 (1984)). Since then, a liquid crystal display element making use of a super twisted nematic (hereinafter abbreviated to STN) mode wherein the aligning direction of nematic liquid crystal molecules is twisted by 180° to 300° between the upper and lower electrode substrates has been developed, and a liquid crystal display device having a satisfactory display quality even in the case of a liquid crystal display of a large picture surface has been under development. In the case of an aligning membrane used for such a device, in order to not only merely align the liquid crystals but also to improve the response properties of the device and ensure the bistability thereof, a definite angle (hereinafter abbreviated to "pretilt angle") should be provided between the substrate plane and the liquid crystal molecules. Further, as the twist angle is increased, it is preferred to increase the pretilt angle. As to the interface processing on the electrode substrates, in the case of a relatively small twist angle (180° to 200° twist) among the above twist angles, a currently generally used cell provided with an aligning membrane having an interface having a pretilt angle (abbreviated to $\theta$) of 5° or less may be sufficient. However, in the case of a mode having a twist angle of 210° to 300° at which a better display quality is afforded, it is necessary to use an interface having a large pretilt angle ($5° < \theta \leq 30°$); hence a liquid crystal display cell provided with an aligning coating satisfying these pretilt angles is required.

In the case of currently used polyimide aligning coatings for TN mode, the pretilt angle of display cells prepared on a commercial scale has a limitation of 5°.

Further, polyimide aligning coatings for STN mode having a larger pretilt angle are present, but the coatings have a problem in the aspect of the stability and reproducibility of the tilt angle over the total region of the cell substrate having a broad display area. In order to certainly obtain a large pretilt angle, formation of a thin coating by means of oblique vacuum deposition such as SiO is the best process currently carried out.

However, as to the formation of a thin coating by means of vacuum deposition, when the coating is commercially mass-produced, it is disadvantageous in the cost in the aspect of production device. Thus, it has been earnestly desired to obtain alignment and a large pretilt angle by subjecting an organic thin coating to surface treatment by rubbing in the same manner as that employed in the case of conventional TN mode and realize the stability and reproducibility of the tilt angle.

On the other hand, Japanese patent application laid-open No. Sho 61-240223/1986 discloses a liquid crystal display element provided with a liquid crystal-aligning coating using a polyimide resin having repetition units expressed by the formula

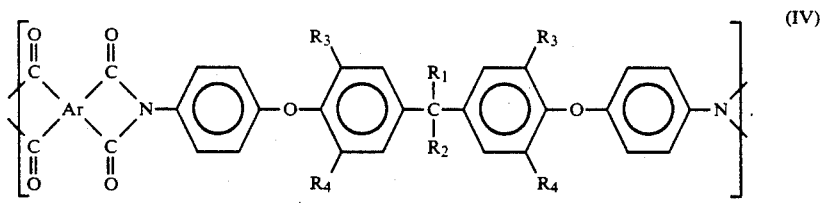

(IV)

Further, the above laid-open application discloses a working example using as a raw material for the above polyimide, a diamine expressed by the formula

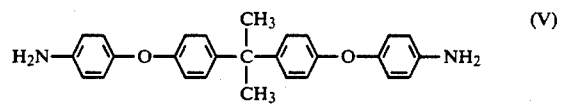

(V)

However, the polyimide aligning coating obtained by using the diamine compound has a drawback that a large pretilt angle cannot be obtained, as described in Comparative example mentioned later. Thus a novel diamino compound used as the raw material for the organic aligning coating has been desired.

SUMMARY OF THE INVENTION

As apparent from the foregoing, an object of the present invention is to provide a liquid crystal-aligning coating capable of realizing a good alignment and a large pretilt angle by a rubbing treatment, and a liquid crystal element such as liquid crystal light modulation element, liquid crystal display element, etc., provided with the above-mentioned aligning coating.

Further, another object of the present invention is to provide a novel diamino compound and its intermediate as a raw material for an organic aligning coating capable of realizing a good alignment and a large pretilt angle by a rubbing treatment.

The present invention resides in the following constitutions:

(1) a liquid crystal-aligning coating composed mainly of a high molecule containing in its molecular long chain, a substituted cyclohexylidene group or a cyclohexylidene group expressed by the formula

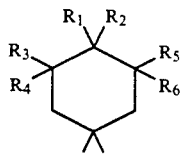 (1)

wherein $R_1$ to $R_6$ of the cyclohexyl group each represent a hydrogen atom, an alkyl group of 1 to 15 carbon atoms, a cyclohexyl group or an alkylcyclohexyl group having an alkyl group of 1 to 15 carbon atoms, and may be each the same or partly or totally different from one another;

(2) a liquid crystal-aligning coating composed mainly of a polyimide having a structural unit expressed by the formula

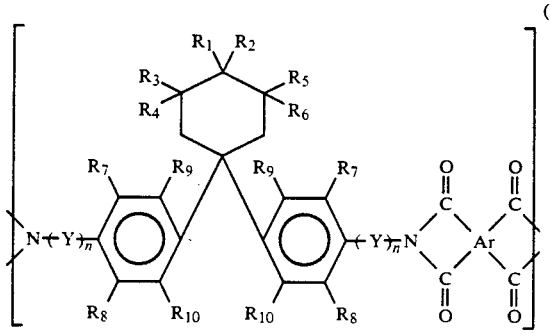 (2)

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be each the same or partly or totally different from one another, Y represents

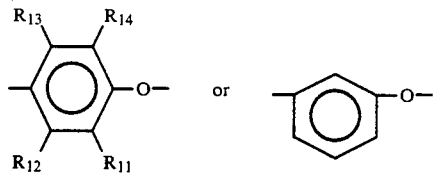

n represents 0 or 1, to $R_{14}$ each represent a hydrogen atom an alkyl group of 1 to 3 carbon atoms, a fluorine atom or a chlorine atom and may be the same or partly or totally different from one another and Ar represents a tetravalent aromatic group;

(3) a liquid crystal-aligning coating according to item (2), obtained by mixing a tetracarboxylic acid dianhydride expressed by the following formula (3) with a diamino compound expressed by the following formula (4), (5) or (6) in a solvent, followed by reacting the both to form a polyamic acid and heating said polyamic acid;

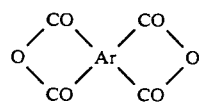 (3)

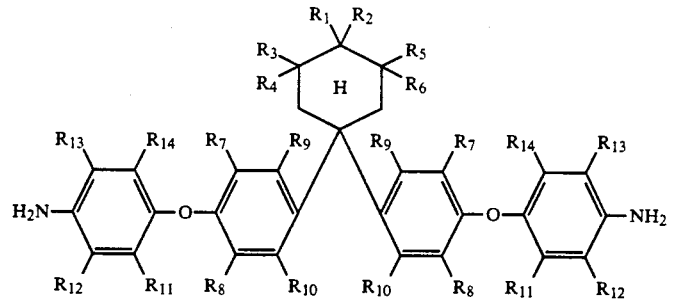 (4)

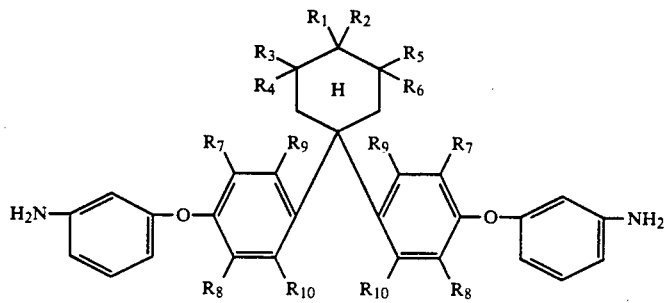 (5)

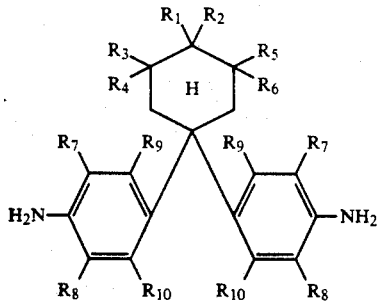

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be same as one another or partly or totally different from one another, $R_7$ to $R_{14}$ each represent a hydrogen atom, an alkyl group of 1 to 3 carbon atoms, a fluorine atom or a chlorine atom and may be each the same or partly or totally different from one another, and Ar represents a tetravalent aromatic group;

(4) a liquid crystal-aligning coating according to item (2), obtained by mixing a tetracarboxylic acid dianhydride expressed by the following formula (3) with a diamine compound expressed by the following formula (4), (5) or (6) in a solvent, followed by reacting the both to form a polyamic acid and heating said polyamic acid together with a silicon compound expressed by the following formula (7):

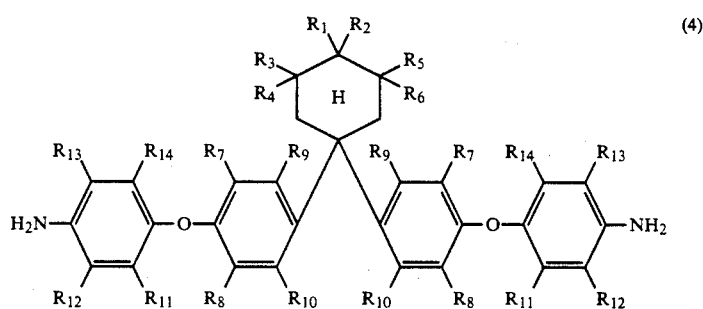

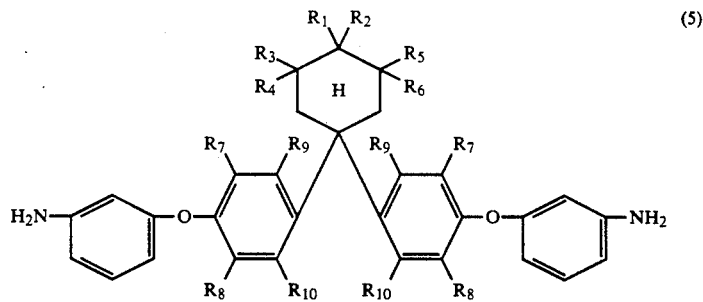

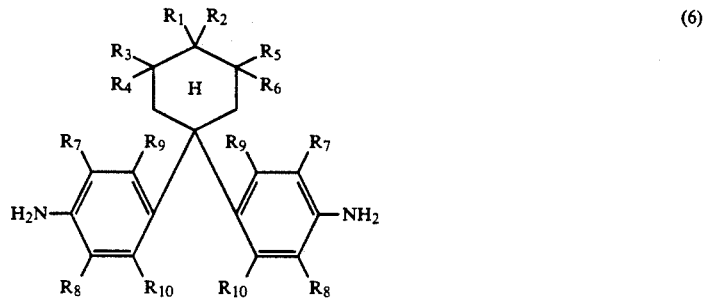

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be same as one another or partly or totally different from one another, $R_7$ to $R_{14}$ each represent a hydrogen atom, an alkyl group of 1 to 3 carbon atoms, a fluorine atom or a chlorine atom and may be each the same or partly or totally different from one another, Ar represents a tetravalent aromatic group, Z represents an alkylene group of 2 to 10 carbon atoms or a phenylene group and $R_{15}$ represents an alkyl group of 1 to 10 carbon atoms;

(5) a liquid crystal-aligning coating according to item (2), composed mainly of a polyether polyimide having a structural unit expressed by the formula

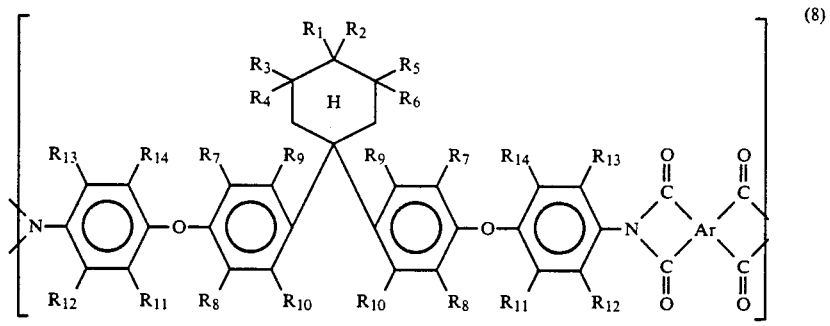

(8)

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be each the same or partly or totally different from one another, $R_7$ to $R_{14}$ each represent a hydrogen atom, an alkyl group of 1 to 3 carbon atoms, a fluorine atom or a chlorine atom and may be the same or partly or totally different from one another and Ar represents a tetravelent aromatic group;

(6) a liquid crystal-aligning coating according to item (5), having a substituted imido group expressed by the formula

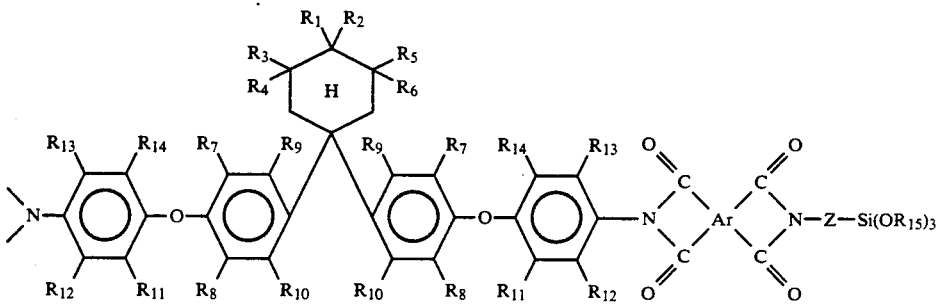

(9)

wherein Z represents an alkylene group of 2 to 10 carbon atoms or a phenylene group and $R_{15}$ represents an alkyl group of 1 to 10 carbon atoms.

(7) a liquid crystal-aligning coating according to item (2), composed mainly of a polyether polyimide having a structural unit expressed by the formula

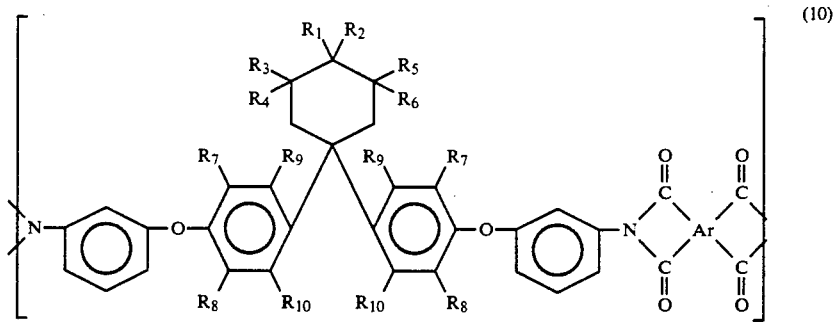

(10)

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be each the same or partly or totally different from one another, $R_7$ to $R_{10}$ each represent a hydrogen atom, an alkyl group of 1 to 3 carbon atoms, a fluorine atom or a chlorin atom and may be the same as one another or partly or totally different from one another and Ar represents a tetravalent aromatic group;

(8) a liquid crystal-aligning coating according to item (2), composed mainly of a polyimide having a structural unit expressed by the formula

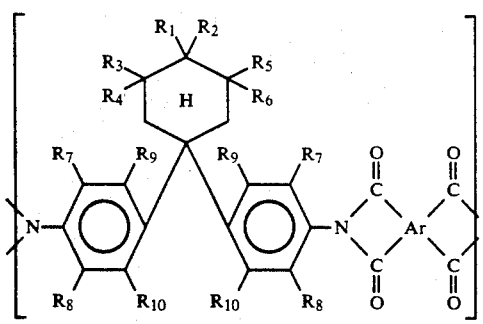

(11)

wherein $R_1$ to $R_6$ each represent a hydrogen atom, an alkyl group of 1 to 15 carbon atoms, a cyclohexyl group or an alkylcyclohexyl group having an alkyl group of 1 to 15 carbon atoms and may be each the same or partly or totally different from one another, and Ar represents a tetravalent aromatic group;

(9) a liquid crystal-aligning coating according to item (8), having a substituted imino group expressed by the formula

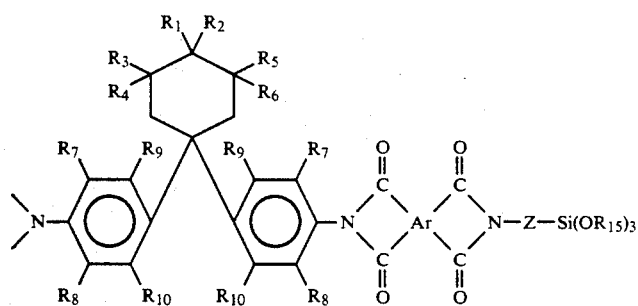

wherein Z represents an alkylene group of 2 to 4 carbon atoms or a phenylene group and $R_{15}$ represents an alkyl group of 1 to 3 carbon atoms;

(10) a liquid crystal display element using a liquid crystal-aligning coating as set forth in item (1);

(11) a diamino compound expressed by the formula

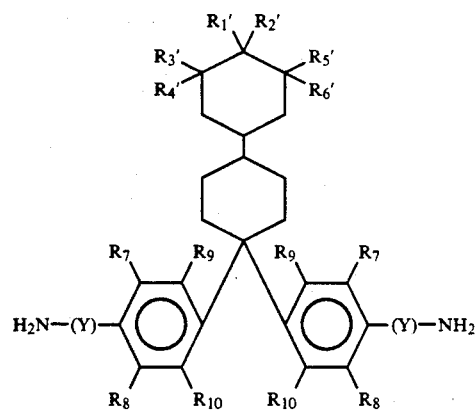

(I)

wherein $R'_1$ to $R'_6$ each represent a hydrogen atom or an alkyl group of 1 to 15 carbon atoms, Y represents

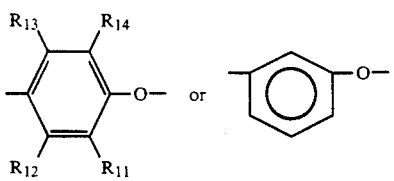

and $R_7$ to $R_{14}$ each represent a hydrogen atom, a fluorine atom, a chlorine atom or an alkyl group of 1 to 3 carbon atoms;

(12) a dinitro compound expressed by the formula (II)

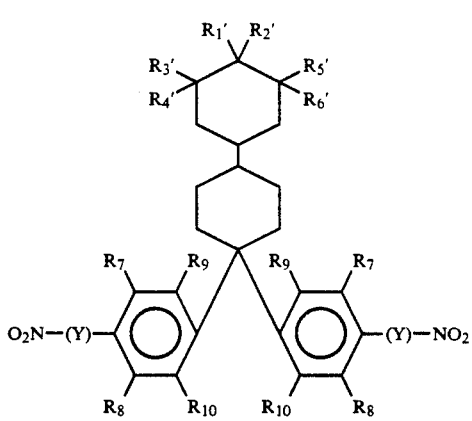

(12)

wherein $R'_1$ to $R'_6$ each represent a hydrogen atom or an alkyl group of 1 to 15 carbon atoms, Y represents

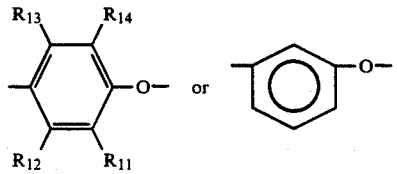

and $R_7$ to $R_{14}$ each represent a hydrogen atom, a fluorine atom, a chlorine atom or an alkyl group of 1 to 3 carbon atoms; and

(13) a diol compound expressed by the formula

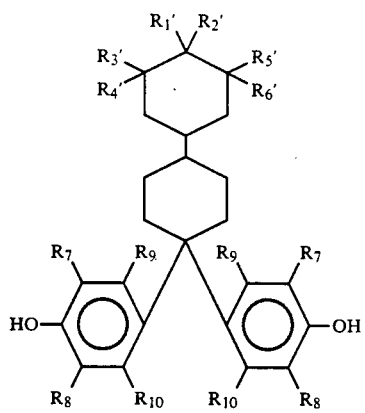

(III)

wherein $R'_1$ to $R'_6$ each represent a hydrogen atom or an alkyl group of 1 to 15 carbon atoms and $R_7$ to $R_{10}$ each represent a hydrogen atom, a fluorine atom, a chlorine atom or an alkyl group of 1 to 3 carbon atoms.

DETAILED DESCRIPTION OF PREFERRED EMBODIMENTS

Figure 1:
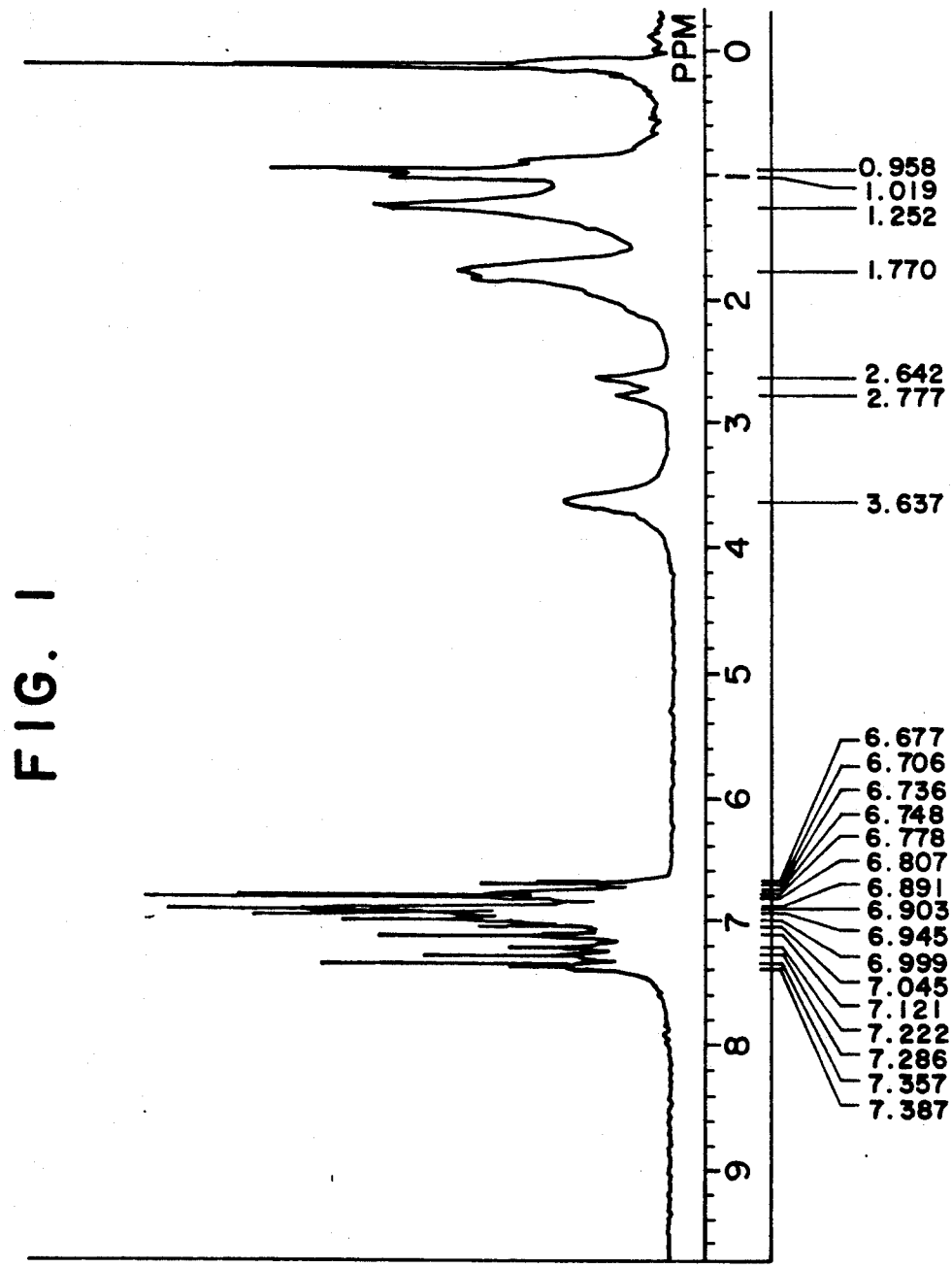
FIG. 1, FIG. 2 and FIG. 3 show the respective views of 90 MHz $^1$H-NMR spectra of diamino compounds of the present invention obtained in Examples 1, 2 and 3.

Concrete examples of the above high molecules are aromatic polyimides, polyamides, polyesters, polyethers, polysulfones, polysulfides, polyphenylenes, polycarbonates, etc.

Compounds expressed by the above formula (2) are polyether imides expressed by the above formulas (8) or (10) and polyimides expressed by the above formula (11).

The number of the respective structural units of these formulas is considered to be 10 to 50,000.

Examples of concrete structural units of such polyether imides and polyimides are

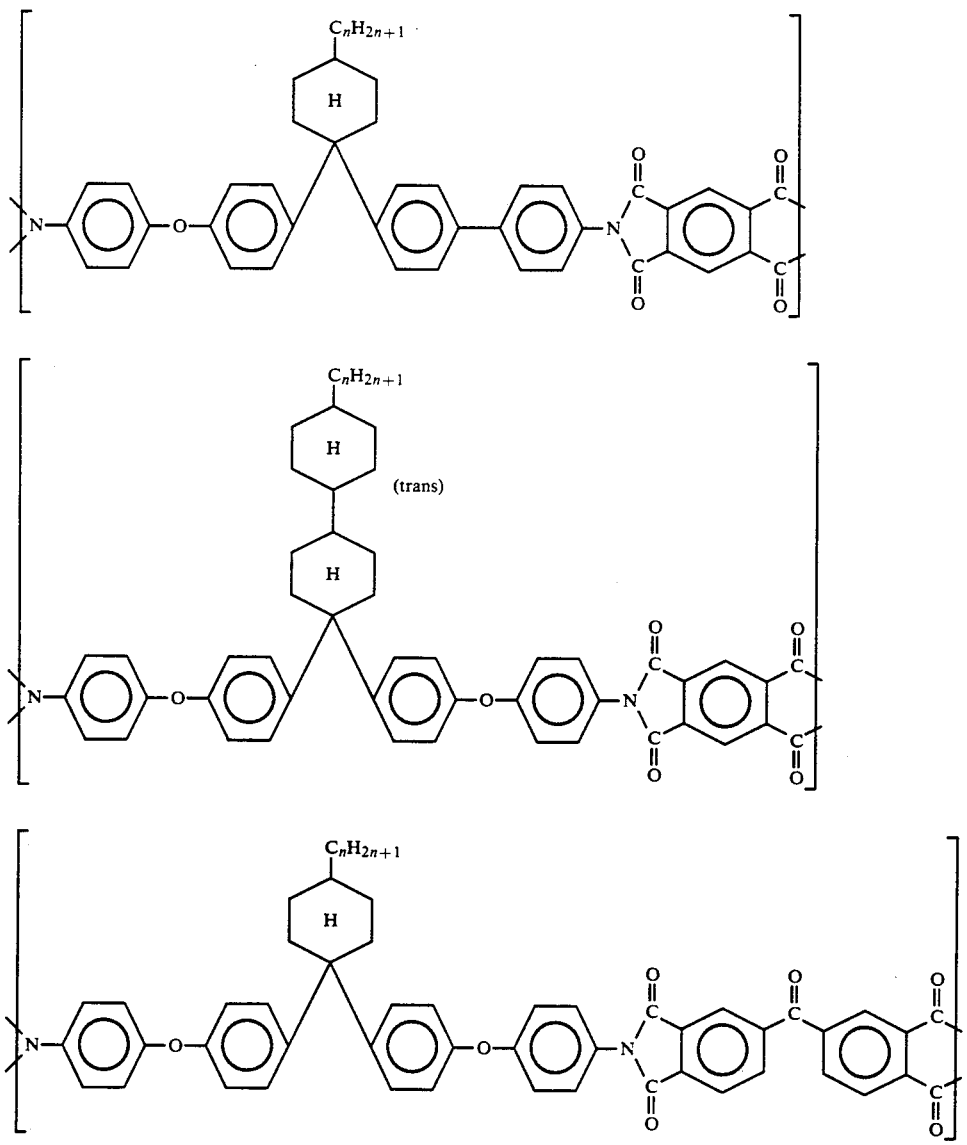

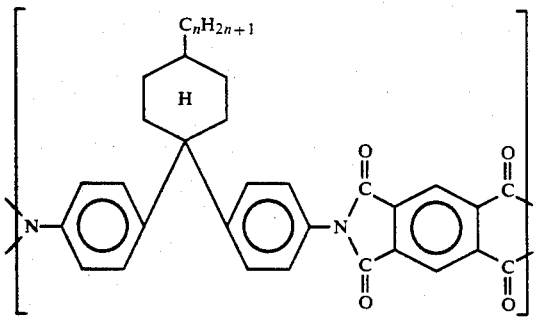

In these formulas, n represents 0 to 10.

The liquid crystal element of the present invention is characterized by being provided with an alignment-controlling coating i.e. a liquid crystal-aligning coating, capable of realizing a good alignment property and a large pretilt angle, and the element is usually composed of substrates, a voltage-impressing means, an alignment-controlling coating, a liquid crystal layer, etc.

Formation of the liquid crystal-aligning coating of the present invention will be concretely described below.

The polyimide or polyether imide forming the liquid crystal-aligning coating is generally insoluble in solvents. Thus, in order to provide a uniform polyether imide high molecule coating on a substrate, there is preferred a process of dissolving as a precursor of the high molecule, a polyamic acid usually prepared by condensing a tetracarboxylic acid dianhydride with a diamino compound, in a solvent such as N-methyl-2-pyrrolidone (NMP), dimethylacetamide (DMAC) dimethylformamide (DMF), dimethyl sulfoxide (DMSO), etc., followed by coating the solution onto a substrate according to a process such as brushing process, immersion process, rotating-coating process, spray process, printing process, etc. and subjecting the resulting substrate to heat-treatment at 100° to 450° C., preferably 150° to 300° C. to subject the polymer to dehydration-ring closure reaction to thereby form an imide bond.

The polyamic acid as the precursor of the above polyimide is usually prepared by condensing a tetracarboxylic dianhydride with a diamino compound. Such a condensation reaction is carried out under anhydrous condition, in a solvent such as N-methyl-2-pyrrolidone (NMP), dimethylacetamide (DMAC), dimethylformamide (DMF), dimethyl sulfoxide (DMSO), dimethyl sulfate, sulfolane, butyrolactone, cresol, phenol, halogenated phenol, cyclohexanone, dioxane, tetrahydrofurane, etc., preferably N-methyl-2-pyrrolidone (NMP), at 50° C. or lower. However, if the polyether imide high molecules has no problem in the aspect of its solubility into solvents, the high molecule may be reacted at a high temperature at a stage prior to coating onto a substrate to use the resulting material as a polyimide varnish.

As the above diamino compound, compounds expressed by the following formulas belonging to the above formula (4) are mentioned:

1,1-bis[4-(4-aminophenoxy)phenyl]-4-substituted cyclohexane expressed by the formula (i)

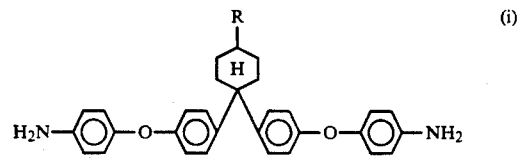

wherein R represents hydrogen atom or an alkyl group of 1 to 15 carbon atoms.

Concrete examples thereof are as follows:
1,1-Bis[4-(4-aminophenoxy)phenyl]cyclohexane
1,1-Bis[4-(4-aminophenoxy)phenyl]-4-methylcyclohexane
1,1-Bis[4-(4-aminophenoxy)phenyl]-4-ethylcyclohexane
1,1-Bis[4-(4-aminophenoxy)phenyl]-4-n-propylcyclohexane
1,1-Bis[4-(4-aminophenoxy)phenyl]-4-n-butylcyclohexane
1,1-Bis[4-(4-aminophenoxy)phenyl]-4-n-pentylcyclohexane
1,1-Bis[4-(4-aminophenoxy)phenyl]-4-n-hexylcyclohexane
1,1-Bis[4-(4-aminophenoxy)phenyl]-4-n-heptylcyclohexane
1,1-Bis[4-(4-aminophenoxy)phenyl]-4-n-octylcyclohexane
1,1-Bis[4-(4-aminophenoxy)phenyl]-4-n-nonylcyclohexane
1,1-Bis[4-(4-aminophenoxy)phenyl]-4-n-decylcyclohexane
1,1-Bis[4-(4-aminophenoxy)phenyl]-4-n-undecylcyclohexane
1,1-Bis[4-(4-aminophenoxy)phenyl]-4-n-dodecylcyclohexane
1,1-Bis[4-(4-aminophenoxy)phenyl]-4-n-tridecylcyclohexane
1,1-Bis[4-(4-aminophenoxy)phenyl]-4-n-tetradecylcyclohexane
1,1-Bis[4-(4-aminophenoxy)phenyl]-4-n-pentadecylcyclohexane
1,1-Bis[4-(4-aminophenoxy)-3,5-dimethylphenyl]-4-substituted cyclohexane expressed by the formula (ii)

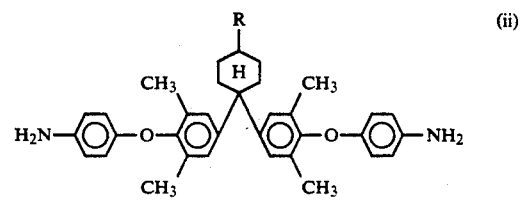

wherein R represents hydrogen atom or an alkyl group of 1 to 15 carbon atoms.

Concrete examples thereof are as follows:

1,1-Bis[4-(4-aminophenoxy)-3,5-dimethylphenyl]-4-methylcyclohexane
1,1-Bis[4-(4-aminophenoxy)-3,5-dimethylphenyl]-4-ethylcyclohexane
1,1-Bis[4-(4-aminophenoxy)-3,5-dimethylphenyl]-4-n-propylcyclohexane
1,1-Bis[4-(4-aminophenoxy)-3,5-dimethylphenyl]-4-n-butylcyclohexane
1,1-Bis[4-(4-aminophenoxy)-3,5-dimethylphenyl]-4-n-pentylcyclohexane
1,1-Bis[4-(4-aminophenoxy)-3,5-dimethylphenyl]-4-n-hexylcyclohexane
1,1-Bis[4-(4-aminophenoxy)-3,5-dimethylphenyl]-4-n-heptylcyclohexane
1,1-Bis[4-(4-aminophenoxy)-3,5-dimethylphenyl]-4-n-octylcyclohexane
1,1-Bis[4-(4-aminophenoxy)-3,5-dimethylphenyl]-4-n-nonylcyclohexane
1,1-Bis[4-(4-aminophenoxy)-3,5-dimethylphenyl]-4-n-decylcyclohexane
1,1-Bis[4-(4-aminophenoxy)-3,5-dimethylphenyl]-4-n-undecylcyclohexane
1,1-Bis[4-(4-aminophenoxy)-3,5-dimethylphenyl]-4-n-dodecylcyclohexane
1,1-Bis[4-(4-aminophenoxy)-3,5-dimethylphenyl]-4-n-tridecylcyclohexane
1,1-Bis[4-(4-aminophenoxy)-3,5-dimethylphenyl]-4-n-tetradecylcyclohexane
1,1-Bis[4-(4-aminophenoxy)-3,5-dimethylphenyl]-4-n-pentadecylcyclohexane Further, as the above diamino compound, compound expressed by the following formulas belonging to the above formula (5) are mentioned:

1,1-Bis[4-(3-aminophenoxy)phenyl]-4-(4-substituted cyclohexyl) expressed by the formula (iii)

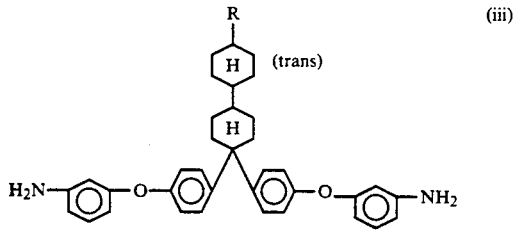

wherein R is as defined above.

Concrete examples thereof are as follows:

1,1-Bis[4-(3-aminophenoxy)phenyl]-4-cyclohexylcyclohexane
1,1-Bis[4-(3-aminophenoxy)phenyl]-4-(trans-4-methylcyclohexyl)cyclohexane
1,1-Bis[4-(3-aminophenoxy)phenyl]-4-(trans-4-ethylcyclohexyl)cyclohexane
1,1-Bis[4-(3-aminophenoxy)phenyl]-4-(trans-4-n-propylcyclohexyl)cyclohexane
1,1-Bis[4-(3-aminophenoxy)phenyl]-4-(trans-4-n-butylcyclohexyl)cyclohexane
1,1-Bis[4-(3-aminophenoxy)phenyl]-4-(trans-4-n-pentylcyclohexyl)cyclohexane
1,1-Bis[4-(3-aminophenoxy)phenyl]-4-(trans-4-n-hexylcyclohexyl)cyclohexane
1,1-Bis[4-(3-aminophenoxy)phenyl]-4-(trans-4-n-heptylcyclohexyl)cyclohexane
1,1-Bis[4-(3-aminophenoxy)phenyl]-4-(trans-4-n-octylcyclohexyl)cyclohexane
1,1-Bis[4-(3-aminophenoxy)phenyl]-4-(trans-4-n-nonylcyclohexyl)cyclohexane
1,1-Bis[4-(3-aminophenoxy)phenyl]-4-(trans-4-n-decylcyclohexyl)cyclohexane
1,1-Bis[4-(3-aminophenoxy)phenyl]-4-(trans-4-n-undecylcyclohexyl)cyclohexane
1,1-Bis[4-(3-aminophenoxy)phenyl]-4-(trans-4-n-dodecylcyclohexyl)cyclohexane
1,1-Bis[4-(3-aminophenoxy)phenyl]-4-(trans-4-n-tridecylcyclohexyl)cyclohexane
1,1-Bis[4-(3-aminophenoxy)phenyl]-4-(trans-4-n-tetradecylcyclohexyl)cyclohexane
1,1-Bis[4-(3-aminophenoxy)phenyl]-4-(trans-4-n-pentadecylcyclohexyl)cyclohexane 1,1-Bis[4-(3-aminophenoxy)phenyl]-4-substituted cyclohexane expressed by the formula (iv)

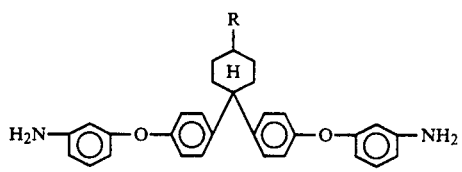

wherein R is as defined above. Concrete examples thereof are as follows:

1,1-Bis[4-(3-aminophenoxy)phenyl]-4-methylcyclohexane
1,1-Bis[4-(3-aminophenoxy)phenyl]-4-ethylcyclohexane
1,1-Bis[4-(3-aminophenoxy)phenyl]-4-n-propylcyclohexane
1,1-Bis[4-(3-aminophenoxy)phenyl]-4-n-butylcyclohexane
1,1-Bis[4-(3-aminophenoxy)phenyl]-4-n-pentylcyclohexane
1,1-Bis[4-(3-aminophenoxy)phenyl]-4-n-hexylcyclohexane
1,1-Bis[4-(3-aminophenoxy)phenyl]-4-n-heptylcyclohexane
1,1-Bis[4-(3-aminophenoxy)phenyl]-4-n-octylcyclohexane
1,1-Bis[4-(3-aminophenoxy)phenyl]-4-n-nonylcyclohexane
1,1-Bis[4-(3-aminophenoxy)phenyl]-4-n-decylcyclohexane
1,1-Bis[4-(3-aminophenoxy)phenyl]-4-n-undecylcyclohexane
1,1-Bis[4-(3-aminophenoxy)phenyl]-4-n-dodecylcyclohexane
1,1-Bis[4-(3-aminophenoxy)phenyl]-4-n-tridecylcyclohexane
1,1-Bis[4-(3-aminophenoxy)phenyl]-4-n-tetradecylcyclohexane
1,1-Bis[4-(3-aminophenoxy)phenyl]-4-n-pentadecylcyclohexane 1,1-Bis[4-(3-aminophenoxy)-3,5-dimethypphenyl-4-substituted cyclohexane expressed by the formula (v)

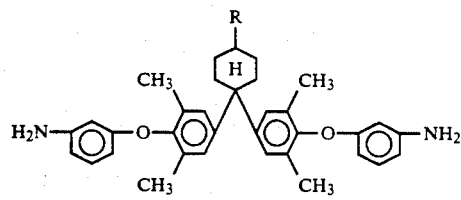

wherein R is defined above.

Concrete examples thereof are as follows:

1,1-Bis[4-(3-aminophenoxy)-3,5-dimethylphenyl]-4-methylcyclohexane
1,1-Bis[4-(3-aminophenoxy)-3,5-dimethylphenyl]-4-ethylcyclohexane
1,1-Bis[4-(3-aminophenoxy)-3,5-dimethylphenyl]-4-n-propylcyclohexane
1,1-Bis[4-(3-aminophenoxy)-3,5-dimethylphenyl]-4-n-butylcyclohexane
1,1-Bis[4-(3-aminophenoxy)-3,5-dimethylphenyl]-4-n-pentylcyclohexane
1,1-Bis[4-(3-aminophenoxy)-3,5-dimethylphenyl]-4-n-hexylcyclohexane
1,1-Bis[4-(3-aminophenoxy)-3,5-dimethylphenyl]-4-n-heptylcyclohexane
1,1-Bis[4-(3-aminophenoxy)-3,5-dimethylphenyl]-4-n-octylcyclohexane
1,1-Bis[4-(3-aminophenoxy)-3,5-dimethylphenyl]-4-n-nonylcyclohexane
1,1-Bis[4-(3-aminophenoxy)-3,5-dimethylphenyl]-4-n-decylcyclohexane
1,1-Bis[4-(3-aminophenoxy)-3,5-dimethylphenyl]-4-n-undecylcyclohexane
1,1-Bis[4-(3-aminophenoxy)-3,5-dimethylphenyl]-4-n-dodecylcyclohexane
1,1-Bis[4-(3-aminophenoxy)-3,5-dimethylphenyl]-4-n-tridecylcyclohexane
1,1-Bis[4-(3-aminophenoxy)-3,5-dimethylphenyl]-4-n-tetradecylcyclohexane
1,1-Bis[4-(3-aminophenoxy)-3,5-dimethylphenyl]-4-n-pentadecylcyclohexane Further, as compounds expressed by the above-mentioned formula (6), 1,1-bis(4-aminophenyl)-4-substituted cyclohexanes or 1,1-bis(4-aminophenyl)-4-(4-substituted cyclohexyl)cyclohexanes expressed by the following formulas are mentioned:

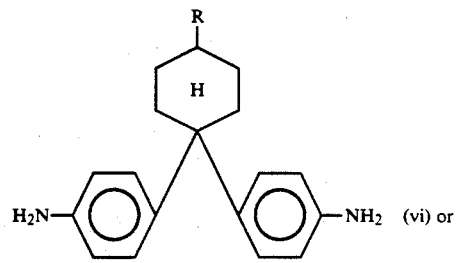

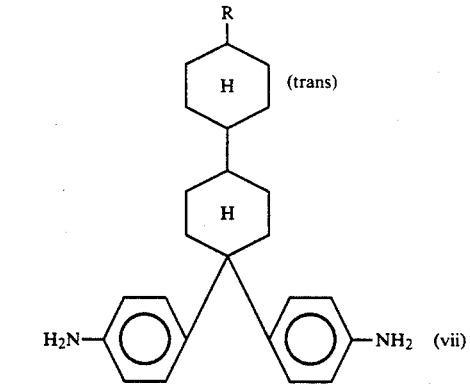

wherein R is as defined above.

Examples of concrete compounds are as follows:
1,1-Bis(4-aminophenyl)-4-n-propylcyclohexane
1,1-Bis(4-aminophenyl)-4-(trans-4-n-pentylcyclohexyl)cyclohexane, etc.

Further, as compounds expressed by the above-mentioned formula (I), 1,1-bis[4-(4-aminophenoxy)phenyl]-4-[4-substituted cyclohexyl)cyclohexanes expressed by the following formula are mentioned:

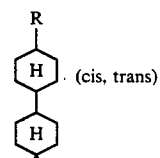

wherein R is as defined above.

Examples of concrete compounds are as follows:
1,1-Bis[4-(4-aminophenoxy)phenyl]-4-cyclohexylcyclohexane
1,1-Bis[4-(4-aminophenoxy)phenyl]-4-(trans-4-methylcyclohexyl)cyclohexane
1,1-Bis[4-(4-aminophenoxy)phenyl]-4-(cis-4-methylcyclohexyl)cyclohexane
1,1-Bis[4-(4-aminophenoxy)phenyl]-4-(trans-4-ethylcyclohexyl)cyclohexane
1,1-Bis[4-(4-aminophenoxy)phenyl]-4-(cis-4-ethylcyclohexyl)cyclohexane
1,1-Bis[4-(4-aminophenoxy)phenyl]-4-(trans-4-n-propylcyclohexyl)cyclohexane
1,1-Bis[4-(4-aminophenoxy)phenyl]-4-(cis-4-n-propylcyclohexyl)cyclohexane
1,1-Bis[4-(4-aminophenoxy)phenyl]-4-(trans-4-n-butylcyclohexyl)cyclohexane
1,1-Bis[4-(4-aminophenoxy)phenyl]-4-(cis-4-n-butylcyclohexyl)cyclohexane
1,1-Bis[4-(4-aminophenoxy)phenyl]-4-(trans-4-n-pentylcyclohexyl)cyclohexane
1,1-Bis[4-(4-aminophenoxy)phenyl]-4-(cis-4-n-pentylcyclohexyl)cyclohexane
1,1-Bis[4-(4-aminophenoxy)phenyl]-4-(trans-4-n-hexylcyclohexyl)cyclohexane
1,1-Bis[4-(4-aminophenoxy)phenyl]-4-(cis-4-n-hexylcyclohexyl)cyclohexane
1,1-Bis[4-(4-aminophenoxy)phenyl]-4-(trans-4-n-heptylcyclohexyl)cyclohexane 1,1-Bis[4-(4-aminophenoxy)phenyl]-4-cis-4-n-heptylcyclohexyl)cyclohexane
1,1-Bis[4-(4-aminophenoxy)phenyl]-4-(trans-4-n-octylcyclohexyl)cyclohexane
1,1-Bis[4-(4-aminophenoxy)phenyl]-4-(cis-4-n-octylcyclohexyl)cyclohexane
1,1-Bis[4-(4-aminophenoxy)phenyl]-4-(trans-4-n-nonylcyclohexyl)cyclohexane
1,1-Bis[4-(4-aminophenoxy)phenyl]-4-(cis-4-n-nonylcyclohexyl)cyclohexane
1,1-Bis[4-(4-aminophenoxy)phenyl]-4-(trans-4-n-decylcyclohexyl)cyclohexane
1,1-Bis[4-(4-aminophenoxy)phenyl]-4-(cis-4-n-decylcyclohexyl)cyclohexane
1,1-Bis[4-(4-aminophenoxy)phenyl]-4-(trans-4-n-undecylcyclohexyl)cyclohexane
1,1-Bis[4-(4-aminophenoxy)phenyl]-4-(cis-4-n-undecylcyclohexyl)cyclohexane
1,1-Bis[4-(4-aminophenoxy)phenyl]-4-(trans-4-n-dodecylcyclohexyl)cyclohexane
1,1-Bis[4-(4-aminophenoxy)phenyl]-4-(cis-4-n-dodecylcyclohexyl)cyclohexane
1,1-Bis[4-(4-aminophenoxy)phenyl]-4-(trans-4-n-tridecylcyclohexyl)cyclohexane
1,1-Bis[4-(4-aminophenoxy)phenyl]-4-(cis-4-n-tridecylcyclohexyl)cyclohexane
1,1-Bis[4-(4-aminophenoxy)phenyl]-4-(trans-4-n-tetradecylcyclohexyl)cyclohexane
1,1-Bis[4-(4-aminophenoxy)phenyl]-4-(cis-4-n-tetradecylcyclohexyl)cyclohexane
1,1-Bis[4-(4-aminophenoxy)phenyl]-4-(trans-4-n-pentadecylcyclohexyl)cyclohexane
1,1-Bis[4-(4-aminophenoxy)phenyl]-4-(cis-4-n-pentadecylcyclohexyl)cyclohexane Further, 1,1-bis[4-(3-aminophenoxy)phenyl]-4-(4-substituted cyclohexyl)cyclohexanes expressed by the following formula are mentioned:

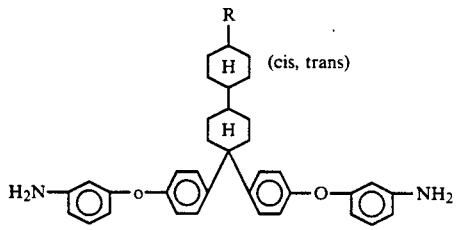 (ix)

Examples of concrete compounds are as follows:
1,1-Bis[4-(3-aminophenoxy)phenyl]-4-(trans-4-methylcyclohexyl)cyclohexane
1,1-Bis[4-(3-aminophenoxy)phenyl]-4-(cis-4-methylcyclohexyl)cyclohexane
1,1-Bis[4-(3-aminophenoxy)phenyl]-4-(trans-4-ethylcyclohexyl)cyclohexane.
1,1-Bis[4-(3-aminophenoxy)phenyl]-4-(cis-4-ethylcyclohexyl)cyclohexane
1,1-Bis[4-(3-aminophenoxy)phenyl]-4-(trans-4-n-propylcyclohexyl)cyclohexane
1,1-Bis[4-(3-aminophenoxy)phenyl]-4-(cis-4-n-propylcyclohexyl)cyclohexane
1,1-Bis[4-(3-aminophenoxy)phenyl]-4-(trans-4-n-butylcyclohexyl)cyclohexane
1,1-Bis[4-(3-aminophenoxy)phenyl]-4-(cis-4-n-butylcyclohexyl)cyclohexane
1,1-Bis[4-(3-aminophenoxy)phenyl]-4-(trans-4-n-pentylcyclohexyl)cyclohexane
1,1-Bis[4-(3-aminophenoxy)phenyl]-4-(cis-4-n-pentylcyclohexyl)cyclohexane
1,1-Bis[4-(3-aminophenoxy)phenyl]-4-(trans-4-n-hexylcyclohexyl)cyclohexane
1,1-Bis[4-(3-aminophenoxy)phenyl]-4-(cis-4-n-hexylcyclohexyl)cyclohexane
1,1-Bis[4-(3-aminophenoxy)phenyl]-4-(trans-4-n-heptylcyclohexyl)cyclohexane
1,1-Bis[4-(3-aminophenoxy)phenyl]-4-(cis-4-n-heptylcyclohexyl)cyclohexane
1,1-Bis[4-(3-aminophenoxy)phenyl]-4-(trans-4-n-octylcyclohexyl)cyclohexane
1,1-Bis[4-(3-aminophenoxy)phenyl]-4-(cis-4-n-octylcyclohexyl)cyclohexane
1,1-Bis[4-(3-aminophenoxy)phenyl]-4-(trans-4-n-nonylcyclohexyl)cyclohexane
1,1-Bis[4-(3-aminophenoxy)phenyl]-4-(cis-4-n-nonylcyclohexyl)cyclohexane
1,1-Bis[4-(3-aminophenoxy)phenyl]-4-(trans-4-n-decylcyclohexyl)cyclohexane
1,1-Bis[4-(3-aminophenoxy)phenyl]-4-(cis-4-n-decylcyclohexyl)cyclohexane
1,1-Bis[4-(3-aminophenoxy)phenyl]-4-(trans-4-n-undecylcyclohexyl)cyclohexane
1,1-Bis[4-(3-aminophenoxy)phenyl]-4-(cis-4-n-undecylcyclohexyl)cyclohexane
1,1-Bis[4-(3-aminophenoxy)phenyl]-4-(trans-4-n-dodecylcyclohexyl)cyclohexane
1,1-Bis[4-(3-aminophenoxy)phenyl]-4-(cis-4-n-dodecylcyclohexyl)cyclohexane
1,1-Bis[4-(3-aminophenoxy)phenyl]-4-(trans-4-n-tridecylcyclohexyl)cyclohexane
1,1-Bis[4-(3-aminophenoxy)phenyl]-4-(cis-4-n-tridecylcyclohexyl)cyclohexane
1,1-Bis[4-(3-aminophenoxy)phenyl]-4-(trans-4-n-tetradecylcyclohexyl)cyclohexane
1,1-Bis[4-(3-aminophenoxy)phenyl]-4-(cis-4-n-tetradecylcyclohexyl)cyclohexane
1,1-Bis[4-(3-aminophenoxy)phenyl]-4-(trans-4-n-pentadecylcyclohexyl)cyclohexane
1,1-Bis[4-(3-aminophenoxy)phenyl]-4-(cis-4-n-pentadecylcyclohexyl)cyclohexane Further, as compounds expressed by the above-mentioned formula (13), 1,1-bis[4-aminophenoxy)-3,5-dimethylphenyl]-4-(4-substituted cyclohexyl)cyclohexanes expressed by the following formula are mentioned:

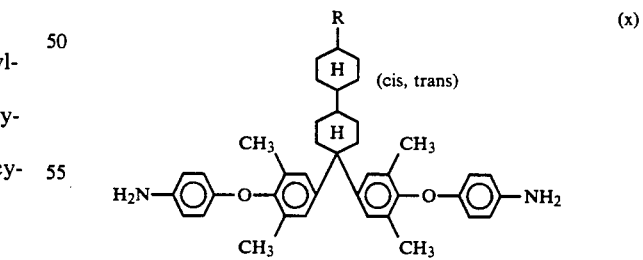 (x)

Examples of concrete compounds are as follows:
1,1-Bis[4-(4-aminophenoxy)-3,5-dimethylphenyl]-4-cyclohexylcyclohexane
1,1-Bis[4-(4-aminophenoxy)-3,5-dimethylphenyl]-4-(trans-4-methylcyclohexyl)cyclohexane
1,1-Bis[4-(4-aminophenoxy)-3,5-dimethylphenyl]-4-(cis-4-methylcyclohexyl)cyclohexane
1,1-Bis[4-(4-aminophenoxy)-3,5-dimethylphenyl]-4-(trans-4-ethylcyclohexyl)cyclohexane 1,1-Bis[4-(4-aminophenoxy)-3,5-dimethylphenyl]-4-(cis-4-ethylcyclohexyl)cyclohexane
1,1-Bis[4-(4-aminophenoxy)-3,5-dimethylphenyl]-4-(trans-4-n-propylcyclohexyl)cyclohexane
1,1-Bis[4-(4-aminophenoxy)-3,5-dimethylphenyl]-4-(cis-4-n-propylcyclohexyl)cyclohexane
1,1-Bis[4-(4-aminophenoxy)-3,5-dimethylphenyl]-4-(trans-4-n-butylcyclohexyl)cyclohexane
1,1-Bis[4-(4-aminophenoxy)-3,5-dimethylphenyl]-4-(cis-4-n-butylcyclohexyl)cyclohexane
1,1-Bis[4-(4-aminophenoxy)-3,5-dimethylphenyl]-4-(trans-4-n-pentylcyclohexyl)cyclohexane
1,1-Bis[4-(4-aminophenoxy)-3,5-dimethylphenyl]-4-(cis-4-n-pentylcyclohexyl)cyclohexane
1,1-Bis[4-(4-aminophenoxy)-3,5-dimethylphenyl]-4-(trans-4-n-hexylcyclohexyl)cyclohexane
1,1-Bis[4-(4-aminophenoxy)-3,5-dimethylphenyl]-4-(cis-4-n-hexylcyclohexyl)cyclohexane
1,1-Bis[4-(4-aminophenoxy)-3,5-dimethylphenyl]-4-(trans-4-n-heptylcyclohexyl)cyclohexane
1,1-Bis[4-(4-aminophenoxy)-3,5-dimethylphenyl]-4-(cis-4-n-heptylcyclohexyl)cyclohexane
1,1-Bis[4-(4-aminophenoxy)-3,5-dimethylphenyl]-4-(trans-4-n-octylcyclohexyl)cyclohexane
1,1-Bis[4-(4-aminophenoxy)-3,5-dimethylphenyl]-4-(cis-4-n-octylcyclohexyl)cyclohexane
1,1-Bis[4-(4-aminophenoxy)-3,5-dimethylphenyl]-4-(trans-4-n-nonylcyclohexyl)cyclohexane
1,1-Bis[4-(4-aminophenoxy)-3,5-dimethylphenyl]-4-(cis-4-n-nonylcyclohexyl)cyclohexane
1,1-Bis[4-(4-aminophenoxy)-3,5-dimethylphenyl]-4-(trans-4-n-decylcyclohexyl)cyclohexane
1,1-Bis[4-(4-aminophenoxy)-3,5-dimethylphenyl]-4-(cis-4-n-decylcyclohexyl)cyclohexane
1,1-Bis[4-(4-aminophenoxy)-3,5-dimethylphenyl]-4-(trans-4-n-undecylcyclohexyl)cyclohexane
1,1-Bis[4-(4-aminophenoxy)-3,5-dimethylphenyl]-4-(cis-4-n-undecylcyclohexyl)cyclohexane
1,1-Bis[4-(4-aminophenoxy)-3,5-dimethylphenyl]-4-(trans-4-n-dodecylcyclohexyl)cyclohexane
1,1-Bis[4-(4-aminophenoxy)-3,5-dimethylphenyl]-4-(cis-4-n-dodecylcyclohexyl)cyclohexane
1,1-Bis[4-(4-aminophenoxy)-3,5-dimethylphenyl]-4-(trans-4-n-tridecylcyclohexyl)cyclohexane
1,1-Bis[4-(4-aminophenoxy)-3,5-dimethylphenyl]-4-(cis-4-n-tridecylcyclohexyl)cyclohexane
1,1-Bis[4-(4-aminophenoxy)-3,5-dimethylphenyl]-4-(trans-4-n-tetradecylcyclohexyl)cyclohexane
1,1-Bis[4-(4-aminophenoxy)-3,5-dimethylphenyl]-4-(cis-4-n-tetradecylcyclohexyl)cyclohexane
1,1-Bis[4-(4-aminophenoxy)-3,5-dimethylphenyl]-4-(trans-4-n-pentadecylcyclohexyl)cyclohexane
1,1-Bis[4-(4-aminophenoxy)-3,5-dimethylphenyl]-4-(cis-4-n-pentadecylcyclohexyl)cyclohexane Further, as compounds expressed by the above-mentioned formula (13), 1,1-bis[4-(3-aminophenoxy)-3,5-dimethylphenyl]-4-[4-substituted cyclohexyl)cyclohexanes expressed by the following formula are mentioned:

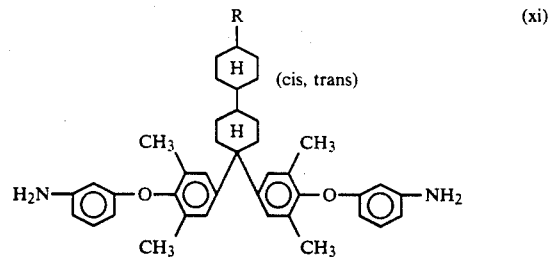

In the above formula, R is as defined.
Examples of concrete compounds are as follows:
1,1-Bis[4-(3-aminophenoxy)-3,5-dimethylphenyl]-4-(trans-4-methylcyclohexyl)cyclohexane
1,1-Bis[4-(3-aminophenoxy)-3,5-dimethylphenyl]-4-(cis-4-methylcyclohexyl)cyclohexane
1,1-Bis[4-(3-aminophenoxy)-3,5-dimethylphenyl]-4-(trans-4-ethylcyclohexyl)cyclohexane
1,1-Bis[4-(3-aminophenoxy)-3,5-dimethylphenyl]-4-(cis-4-ethylcyclohexyl)cyclohexane
1,1-Bis[4-(3-aminophenoxy)-3,5-dimethylphenyl]-4-(trans-4-n-propylcyclohexyl)cyclohexane
1,1-Bis[4-(3-aminophenoxy)-3,5-dimethylphenyl]-4-(cis-4-n-propylcyclohexyl)cyclohexane
1,1-Bis[4-(3-aminophenoxy)-3,5-dimethylphenyl]-4-(trans-4-n-butylcyclohexyl)cyclohexane
1,1-Bis[4-(3-aminophenoxy)-3,5-dimethylphenyl]-4-(cis-4-n-butylcyclohexyl)cyclohexane
1,1-Bis[4-(3-aminophenoxy)-3,5-dimethylphenyl]-4-(trans-4-n-pentylcyclohexyl)cyclohexane
1,1-Bis[4-(3-aminophenoxy)-3,5-dimethylphenyl]-4-(cis-4-n-pentylcyclohexyl)cyclohexane
1,1-Bis[4-(3-aminophenoxy)-3,5-dimethylphenyl]-4-(trans-4-n-hexylcyclohexyl)cyclohexane
1,1-Bis[4-(3-aminophenoxy)-3,5-dimethylphenyl]-4-(cis-4-n-hexylcyclohexyl)cyclohexane
1,1-Bis[4-(3-aminophenoxy)-3,5-dimethylphenyl]-4-(trans-4-n-heptylcyclohexyl)cyclohexane
1,1-Bis[4-(3-aminophenoxy)-3,5-dimethylphenyl]-4-(cis-4-n-heptylcyclohexyl)cyclohexane
1,1-Bis[4-(3-aminophenoxy)-3,5-dimethylphenyl]-4-(trans-4-n-octylcyclohexyl)cyclohexane
1,1-Bis[4-(3-aminophenoxy)-3,5-dimethylphenyl]-4-(cis-4-n-octylcyclohexyl)cyclohexane
1,1-Bis[4-(3-aminophenoxy)-3,5-dimethylphenyl]-4-(trans-4-n-nonylcyclohexyl)cyclohexane
1,1-Bis[4-(3-aminophenoxy)-3,5-dimethylphenyl]-4-(cis-4-n-nonylcyclohexyl)cyclohexane
1,1-Bis[4-(3-aminophenoxy)-3,5-dimethylphenyl]-4-(trans-4-n-decylcyclohexyl)cyclohexane
1,1-Bis[4-(3-aminophenoxy)-3,5-dimethylphenyl]-4-(cis-4-n-decylcyclohexyl)cyclohexane
1,1-Bis[4-(3-aminophenoxy)-3,5-dimethylphenyl]-4-(trans-4-n-undecylcyclohexyl)cyclohexane
1,1-Bis[4-(3-aminophenoxy)-3,5-dimethylphenyl]-4-(cis-4-n-undecylcyclohexyl)cyclohexane
1,1-Bis[4-(3-aminophenoxy)-3,5-dimethylphenyl]-4-(trans-4-n-dodecylcyclohexyl)cyclohexane
1,1-Bis[4-(3-aminophenoxy)-3,5-dimethylphenyl]-4-(cis-4-n-dodecylcyclohexyl)cyclohexane
1,1-Bis[4-(3-aminophenoxy)-3,5-dimethylphenyl]-4-(trans-4-n-tridecylcyclohexyl)cyclohexane
1,1-Bis[4-(3-aminophenoxy)-3,5-dimethylphenyl]-4-(cis-4-n-tridecylcyclohexyl)cyclohexane 1,1-Bis[4-(3-aminophenoxy)-3,5-dimethylphenyl]-4-(trans-4-n-tetradecylcyclohexyl)cyclohexane
1,1-Bis[4-(3-aminophenoxy)-3,5-dimethylphenyl]-4-(cis-4-n-tetradecylcyclohexyl)cyclohexane
1,1-Bis[4-(3-aminophenoxy)-3,5-dimethylphenyl]-4-(trans-4-n-pentadecylcyclohexyl)cyclohexane
1,1-Bis[4-(3-aminophenoxy)-3,5-dimethylphenyl]-4-(cis-4-n-pentadecylcyclohexyl)cyclohexane Next, the dinitro compounds of the present invention will be illustrated.

As compounds belonging to the above-mentioned formula (14), 1,1-bis[4-(4-nitrophenoxy)phenyl]-4-(4-substituted cyclohexyl)cyclohexanes expressed by the formula

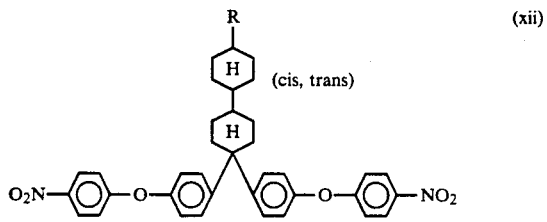

are mentioned. In the formula, R is as defined as above.
Concrete examples are as follows:
1,1-Bis[4-(4-nitrophenoxy)phenyl]-4-cyclohexylcyclohexane
1,1-Bis[4-(4-nitrophenoxy)phenyl]-4-(trans-4-methylcyclohexyl)cyclohexane
1,1-Bis[4-(4-nitrophenoxy)phenyl]-4-(cis-4-methylcyclohexyl)cyclohexane
1,1-Bis[4-(4-nitrophenoxy)phenyl]-4-(trans-4-ethylcyclohexyl)cyclohexane
1,1-Bis[4-(4-nitrophenoxy)phenyl]-4-(cis-4-ethylcyclohexyl)cyclohexane
1,1-Bis[4-(4-nitrophenoxy)phenyl]-4-(trans-4-n-propylcyclohexyl)cyclohexane
1,1-Bis[4-(4-nitrophenoxy)phenyl]-4-(cis-4-n-propylcyclohexyl)cyclohexane
1,1-Bis[4-(4-nitrophenoxy)phenyl]-4-(trans-4-n-butylcyclohexyl)cyclohexane
1,1-Bis[4-(4-nitrophenoxy)phenyl]-4-(cis-4-n-butylcyclohexyl)cyclohexane
1,1-Bis[4-(4-nitrophenoxy)phenyl]-4-(trans-4-n-pentylcyclohexyl)cyclohexane
1,1-Bis[4-(4-nitrophenoxy)phenyl]-4-(cis-4-n-pentylcyclohexyl)cyclohexane
1,1-Bis[4-(4-nitrophenoxy)phenyl]-4-(trans-4-n-hexylcyclohexyl)cyclohexane
1,1-Bis[4-(4-nitrophenoxy)phenyl]-4-(cis-4-n-hexylcyclohexyl)cyclohexane
1,1-Bis[4-(4-nitrophenoxy)phenyl]-4-(trans-4-n-heptylcyclohexyl)cyclohexane
1,1-Bis[4-(4-nitrophenoxy)phenyl]-4-(cis-4-n-heptylcyclohexyl)cyclohexane
1,1-Bis[4-(4-nitrophenoxy)phenyl]-4-(trans-4-n-octylcyclohexyl)cyclohexane
1,1-Bis[4-(4-nitrophenoxy)phenyl]-4-(cis-4-n-octylcyclohexyl)cyclohexane
1,1-Bis[4-(4-nitrophenoxy)phenyl]-4-(trans-4-n-nonylcyclohexyl)cyclohexane
1,1-Bis[4-(4-nitrophenoxy)phenyl]-4-(cis-4-n-nonylcyclohexyl)cyclohexane
1,1-Bis[4-(4-nitrophenoxy)phenyl]-4-(trans-4-n-decylcyclohexyl)cyclohexane
1,1-Bis[4-(4-nitrophenoxy)phenyl]-4-(cis-4-n-decylcyclohexyl)cyclohexane As compounds expressed by the above-mentioned formula (15), 1,1-bis(4-hydroxyphenyl)-4-(4-substituted cyclohexyl)cyclohexanes expressed by the formula

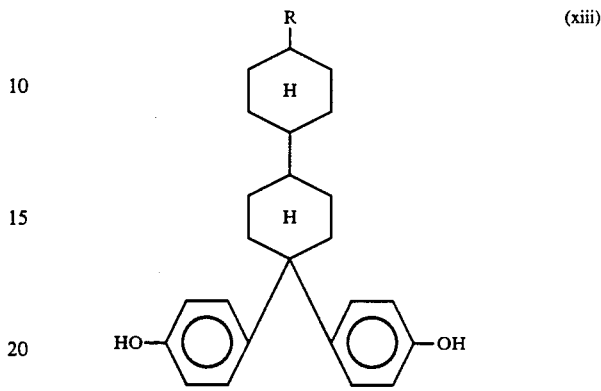

In the above formula, R is as defined above.
Concrete examples are as follows:
1,1-Bis(4-hydroxyphenyl)-4-cyclohexylcyclohexane
1,1-Bis(4-hydroxyphenyl)-4-(trans-4-methylcyclohexyl)cyclohexane
1,1-Bis(4-hydroxyphenyl)-4-(cis-4-methylcyclohexyl)cyclohexane
1,1-Bis(4-hydroxyphenyl)-4-(trans-4-ethylcyclohexyl)cyclohexane
1,1-Bis(4-hydroxyphenyl)-4-(cis-4-ethylcyclohexyl)cyclohexane
1,1-Bis(4-hydroxyphenyl)-4-(trans-4-n-propylcyclohexyl)cyclohexane
1,1-Bis(4-hydroxyphenyl)-4-(cis-4-n-propylcyclohexyl)cyclohexane
1,1-Bis(4-hydroxyphenyl)-4-(trans-4-n-propylcyclohexyl)cyclohexane
1,1-Bis(4-hydroxyphenyl)-4-(cis-4-n-propylcyclohexyl)cyclohexane
1,1-Bis(4-hydroxyphenyl)-4-(trans-4-n-butylcyclohexyl)cyclohexane
1,1-Bis(4-hydroxyphenyl)-4-(cis-4-n-butylcyclohexyl)cyclohexane
1,1-Bis(4-hydroxyphenyl)-4-(trans-4-n-pentylcyclohexyl)cyclohexane
1,1-Bis(4-hydroxyphenyl)-4-(cis-4-n-pentylcyclohexyl)cyclohexane
1,1-Bis(4-hydroxyphenyl)-4-(trans-4-n-hexylcyclohexyl)cyclohexane
1,1-Bis(4-hydroxyphenyl)-4-(cis-4-n-hexylcyclohexyl)cyclohexane
1,1-Bis(4-hydroxyphenyl)-4-(trans-4-n-heptylcyclohexyl)cyclohexane
1,1-Bis(4-hydroxyphenyl)-4-(cis-4-n-heptylcyclohexyl)cyclohexane
1,1-Bis(4-hydroxyphenyl)-4-(trans-4-n-octylcyclohexyl)cyclohexane
1,1-Bis(4-hydroxyphenyl)-4-(cis-4-n-octylcyclohexyl)cyclohexane
1,1-Bis(4-hydroxyphenyl)-4-(trans-4-n-nonylcyclohexyl)cyclohexane
1,1-Bis(4-hydroxyphenyl)-4-(cis-4-n-nonylcyclohexyl)cyclohexane
1,1-Bis(4-hydroxyphenyl)-4-(trans-4-n-decylcyclohexyl)cyclohexane 1,1-Bis(4-hydroxyphenyl)-4-(cis-4-n-decylcyclohexyl)-cyclohexane The diamino compound of the formula (I) of the present invention is produced according to the following reaction steps, and the diol compound of the formula (III) of the present invention and the dinitro compound of the formula (II) of the present invention are each an intermediate thereof:

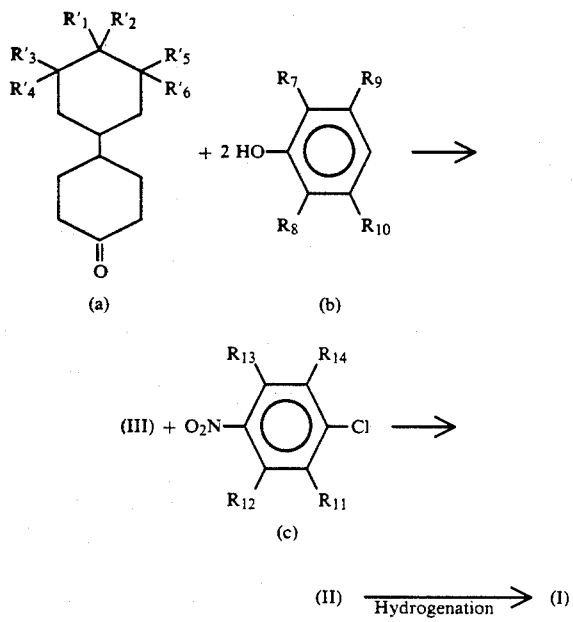

Herein, (I), (II) and (III) represent the above-mentioned formulas, respectively, and $R'_1$ to $R'_6$ and $R_7$ to $R_{14}$ are as defined above.

Production of the diamino compound of the present invention will be described in more detail.

(First step)

4-Cyclohexyl-cyclohexanone or its derivative(a) and phenol or its derivative (b) such as o-cresol, m-cresol, 2,6-dimethylphenol, etc. are reacted with conc. hydrochloric acid, without any solvent or in a suitable solvent such as toluene, xylene, etc. at 0° to 70° C., preferably 10° to 40° C. to obtain a diol compound (III).

(Second step)

The diol compound (III) and p-chloronitrobenzene or its derivative (c) such as 5-chloro-2-nitrotoluene are subjected to condensation reaction in a solvent of dimethylsulfoxide (hereinafter abbreviated to DMSO), using KOH or NaOH and at 40° to 80° C. to obtain a dinitro compound (II).

(Third step)

The nitro compound (II) is subjected to a catalytic hydrogenation in a solvent such as toluene, xylene, benzene, ethanol, methanol, etc., using a catalyst of paradium-carbon (hereinafter abbreviated to Pd-C) and at 30° to 80° C., to obtain a diamino compound (I).

As shown in these reaction steps, it is possible to produce various diol compounds by adequately choosing $R'_1$ to $R'_6$ and $R_7$ to $R_{10}$ at the first step, and to selectively produce dinitro compounds and diamino compounds by adeqauately choosing $R_{11}$ to $R_{14}$ at the second step.

The pretilt angle of liquid crystal cells brought about by the polyimide-aligning coating produced by using these various diamino compounds as a raw material, is affected mainly by the chain length of the alkyl chains in $R'_1$ to $R'_6$ and the larger the chain length, the greater the pretilt angle. Further, this value is also affected by the rubbing step which is one of important steps in the production of liquid crystal display elements. Furthermore, the pretilt angle varies within a certain range, depending on other factors of display elements such as the kind of liquid crystals used, preparation conditions of display elements, etc., and in order to cope with these variation factors, when the chain length of the alkyl chains in $R'_1$ to $R'_6$ of the diamino compound of the present invention is adequately chosen, it is possible to obtain the optimum pretilt angle under the preparation conditions of the display elements.

The aligning coating of liquid crystal cells using the diamino compound of the present invention may be obtained according to the following procedure:

A diamino compound of the present invention and pyromellitic dianhydride in a molar ratio of 1:1 may be polymerized by ring-opening addition in a suitable solvent at 0° to 20° C., followed by coating the resulting polyamic acid solution onto a transparent glass substrate (previously subjected, in some cases, to surface treatment with a silane coupling agent) by means of a spinner and then heat-treating the resulting material at about 180° to 300° C. to obtain a polyimide coating i.e. an aligning coating.

The tetracarboxylic dianhydride directed to the liquid crystal-aligning coating of the present invention is compounds expressed by the above-mentioned formula (3). Concrete examples thereof are pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, 2,2',3,3'-benzophenonetetracarboxylic dianhydride, bis(3,4-dicarboxyphenyl) ether dianhydride, bis(3,4-dicarboxyphenyl)-sulfonic dianhydride, 1,2,5,6-naphthalenetetracarboxylic dianhydride, 2,3,6,7-naphthalenetetracarboxylic dianhydride, etc.

In order to enhance the adhesion of the liquid crystal-aligning coating of the present invention onto a substrate, it is also possible to modify a polyether imide or a polyimide by introducing an aminosilicon compound or a diaminosilicon compound thereinto. Concretely, a process of subjecting a substrate to surface treatment with a silicon compound, followed by coating with a polyamic acid solution and heating the resulting material, and a process of coating with a mixed solution of a polyamic acid with a silicon compound are exemplified.

According to such processes, there is formed a liquid crystal-aligning coating consisting of a polyether imide or a polyimide having a substituted imino group expressed by the following formula (9) or (12):

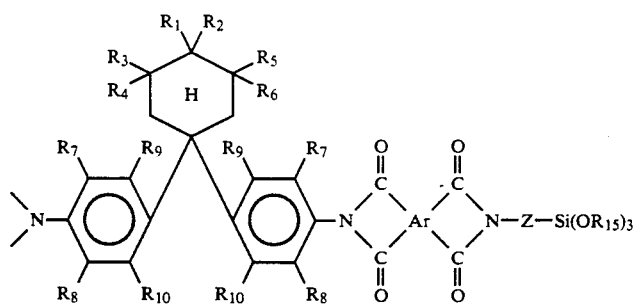

(9)

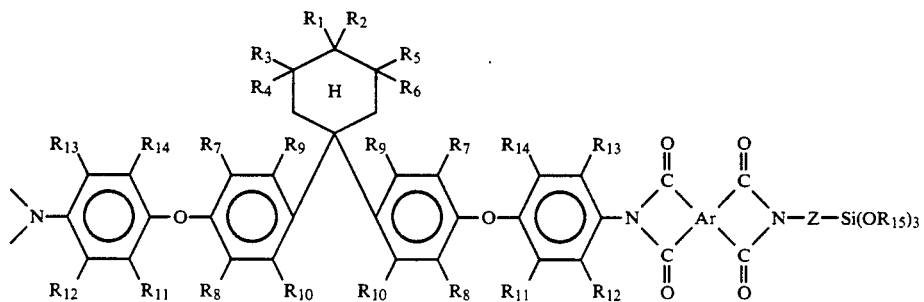

(12)

In the above formulas, $R_1$ to $R_6$ and $R_7$ to $R_{14}$ and Ar are as defined above in the formula (2), Z represents an alkylene group of 2 to 10 carbon atoms or a phenylene group and $R_{15}$ represents an alkyl group of 1 to 10 carbon atoms.

Further, a liquid crystal-aligning coating composed mainly of the structural units expressed by the formulas (2), (8) and (11) and containing 0.1 to 50%, preferably 0.1 to 30% of the structural unit expressed by the following formula (15) is exemplified:

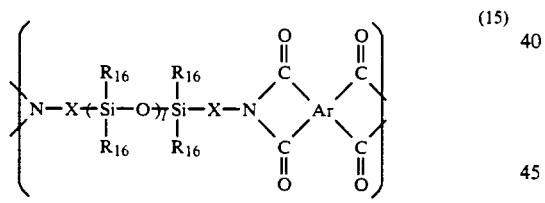

(15)

wherein X represents an alkylene group of 1 to 3 carbon atoms or a phenylene group, $R_{18}$ represents an alkyl group of 1 to 6 carbon atoms, Ar represents a tetravelent aromatic group and l represents an integer of 0 to 4.

The aminosilicon compound is those expressed by the above-mentioned formula (7). Concrete examples are as follows:

$NH_2-(CH_2)_3-Si(OCH_3)_3$ $NH_2-(CH_2)_3-Si(OC_2H_5)_3$ $NH_2-(CH_2)_3-Si(CH_3)(OCH_3)_2$ $NH_2-(CH_2)_3-Si(CH_3)(OC_2H_5)_2$ $NH_2-(CH_2)_3-Si(C_2H_5)(On-C_3H_7)_2$ $NH_2-(CH_2)_2-Si(OCH_3)_3$ $NH_2-(CH_2)_2-Si(OC_2H_5)_3$ $NH_2-(CH_2)_4-Si(CH_3)(OC_2H_5)_2$

-continued

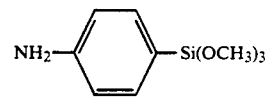

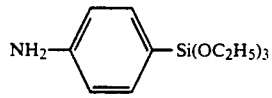

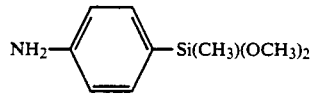

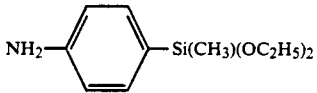

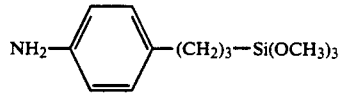

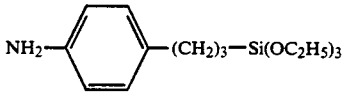

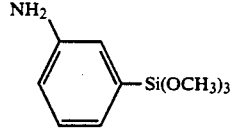

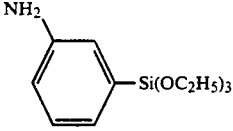

When these aminosilicon compounds are introduced into the polyimide high molecular substances, the content thereof is preferred to be within a range satisfying the following relationship between the compounds and the substances:

$$1 \leq \frac{C}{A - B} \leq 2 \text{ and } 0.1 \leq \frac{C}{B + C}$$

wherein A, B and C represent the respective mol numbers of a tetracarboxylic dianhydride, a diamino compound expressed by the formula (4), (5) or (6) and an aminosilicon compound.

Further, examples of the diaminosilicon compound used for forming the structural unit expressed by the formula (13) are as follows:

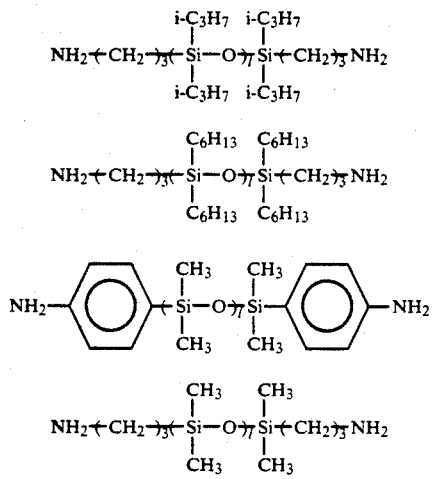

wherein l represents an integer of 0 to 4. When the diamino compounds expressed by the formula (4), (5) or (6) are introduced into the polyimide high molecular substances, 50% by mol or less, preferably 30% by mol or less of the diamino compounds may be replaced by the diaminosilicon compounds.

The polyether imide or polyimide used for the liquid crystal-aligning coating can also be modified by introducing an aromatic diamino compound, an alicyclic diamino compound or a derivative thereof in addition to the above-mentioned component.

Concrete examples thereof are aromatic diamino compounds such as 4,4'-diaminophenyl ether, 4,4'-diaminodiphenylmethane, 4,4'-diaminodiphenylsulfone, 4,4'-diaminodiphenyl sulfide, 4,4'-di(meta-aminophenoxy)diphenylsulfone, 4,4'-di(para-aminophenoxy)-diphenylsulfone, ortho-phenylenediamine, meta-phenylenediamine, paraphenylenediamine, benzidine, 2,2'-diaminobenzophenone, 4,4'-diaminobenzophenone, 4,4'-diaminodiphenyl-2,2'-propane, 1,5-diaminonaphthalene, 1,8-diaminonaphthalene, etc., and alicyclic diamino compounds such as 1,4-diaminocyclohexane, etc.

For providing the liquid crystal-aligning coating of the present invention on a substrate, there is preferred a process of applying onto a substrate, a polyamic acid as a precursor of a polyimide or a polyether imide, obtained by subjecting a tetracarboxylic dianhydride and a diamino compound to condensation, followed by heat treatment for dehydration reaction to form a polyimide high molecular coating onto a substrate.

The process will be concretely described below.

A polyamic acid is dissolved in a solvent such as N-methyl-2-pyrrolidone (NMP), dimethylacetamide (DMAc), dimethylformamide (DMF), dimethyl sulfoxide (DMSO), etc. to prepare 0.1 to 30% by weight, preferably 1 to 10% by weight of the solution, followed by coating the solution onto a substrate according to brushing process, immersion process, rotation-coating process, spray process, printing process or the like to form a coating on the substrate, and subjecting the coating to heat treatment at 100° to 450° C., preferably 150° to 300° C. to effect a dehydration-ring closure reaction to thereby provide a liquid crystal-aligning coating consisting of a polyimide high molecular coating. If the adhesion of the resulting polyimide high molecular coating is inferior, the surface of the substrate is subjected, in advance, to surface treatment with a silane coupling agent, followed by forming a polyimide high molecular coating to thereby improve the adhesion. The coated surface is then rubbed in one direction with a cloth or the like.

As to the substrate, an electrode, concretely a transparent electrode of ITO (indium oxide-tin oxide) or tin oxide is formed on a substrate in advance. Further, an undercoat coating such as insulation coating, polarization sheet, color filter, etc. for preventing an alkali from dissolving out of the substrate may be formed under the electrode, and an overcoat such as insulation coating, color filter coating, light-transmission-preventing coating, etc. may be formed on the electrode. Such an electrode may also form a two-layer structure by the medium of an insulation coating. Active elements such as TFT, non-linear, resistant elements, etc. may also be formed. As to the construction of such an electrode, undercoat and others inside the cell, conventional construction of liquid crystals is usable.

Using the thus formed substrate, a cell is prepared, followed by filling a liquid crystal and sealing a filling port. As the liquid crystal to be filled, various liquid crystals such as conventional nematic liquid crystals and further, liquid crystals having a dichloric dyestuff added thereto, ferroelectric liquid crystals (SmC liquid crystal), etc. are usable.

The pretilt angle was measured by rubbing a polyimide high molecular coating provided on the substrate of liquid crystal element according to the above-mentioned means, in one direction by means of a rubbing device (a liquid cell-rubbing device made by Iinuma Gauge Co., Ltd.), followed by constructing a liquid crystal element so that the cell thickness may be about 20 μm, the rubbing directions of the substrates may be parallel to each other and the substrates may be opposed to each other, and employing a crystal rotation method (T. J. Scheffer and J. Nehring, J. Appl. Phys. 48 (5) 1783 (1977)).

The present invention will be described in more detail by way of Examples, but it should not be construed to be limited thereto.

EXAMPLE 1

A polyetherimide was produced according to the following process:

Dehydrated and purified N-methyl-2-pyrrolidone (200 ml) was introduced into a 500 ml capacity separable flask equipped with a stirrer, a thermometer, a condenser and a nitrogen gas-purging means, and purged with nitrogen gas, followed by feeding 1,1-bis[4-(4-aminophenoxy)phenyl]-4-n-propylcyclohexane (29.96 g, 60.81 mmol), dissolving the materials with stirring, cooling the solution down to 5° C. in an ice bath, adding pyromellitic dianhydride (15.16 g, 69.51 mmol) at a time and reacting the mixture with stirring under cooling so that the reaction system gradually increased its viscosity to generate heat up to 17° C. After the reaction over one hour 30 minutes, p-aminophenyltrimethoxysilane (3.36 g, 5.75 mmol) was added, followed by reacting the mixture with stirring at 10° C. for one hour and diluting the resulting material with N-methylpyrrolidone, to obtain a 10% by weight transparent solution of a polyamic acid consisting of pyromellitic dianhydride, 1,1-bis[4-(4-aminophenoxy)phenyl]-4-n-propylcyclohexane and p-aminophenyltrimethoxysilane in a molar ratio of 8:7:1.8. The solution had a viscosity at 25° C. of 576 cp as measured at 25±0° C. by means of a viscometer (E type made by Tokyo Keiki Co., Ltd.). The solution was further heated with stirring at 45° C. to obtain a solution having a viscosity at 25° C. of 228 cp. This solution was diluted with butyl cellosolve and NMP in the respective proportions of 1:2:2, followed by coating a transparent glass substrate provided with a transparent electrode of ITO on one surface thereof, with the above solution according to a rotation-coating method (spinner method), under coating conditions of 1,500 rpm, preliminary drying for 20 seconds and heat treatment at 200° C. for 90 minutes, to obtain a polyetherimide high molecular coating having a coating thickness of about 1,000 Å.

Successively, two sheets of the above substrate were subjected to rubbing treatment on the coated surface, respectively, followed by constructing a liquid crystal cell so that the rubbing directions might be parallel, the substrates might be opposed to each other and the cell thickness might be 20 μm, sealing a liquid crystal composition ZLI-1132 made by Merck Co., Ltd. in the cell, heating it up to its isotropic liquid temperature and gradually cooling it to obtain a liquid crystal element.

The liquid crystal element exhibited a superior alignment and had a pretilt angle of 11.8° as measured according to the above-mentioned pretilt angle measurement method.

EXAMPLES 2-4

Example 1 was repeated except that 1,1-bis[4-(4aminophenoxy)phenyl]-4-n-propylcyclohexane used in example 1 was replaced by other diamino compounds, to obtain 10% by weight, transparent solutions of polyamic acids each consisting of pyromellitic dianhydride, a diamino compound and p-aminophenyltrimethoxysilane in a molar ratio of 8:7:1.8, followed by subjecting this silution to dilution, coating and heat treatment in the same manner as in Example 1 to form a polyetherimide high molecular coating having a coating thickness of about 1,000 Å and thereby a liquid crystal element having a cell thickness of 20 μm. This liquid crystal element exhibited a superior alignment. Diamino compounds used, the viscosities at 25° C. of the resulting polyamic acid solutions and the pretilt angles of the resulting liquid crystal elements are shown in Table 1.

TABLE 1

| Example | Diamino compound | Viscosity (cp) | Pretilt angle (θ) |
|---|---|---|---|
| 2 | 1,1-Bis[4-(4-aminophenoxy)-phenyl]cyclohexane | 179 | 7.3 |
| 3 | 1,1-Bis[4-(4-aminophenoxy)-phenyl]-4-ethylcyclohexane | 157 | 9.0 |
| 4 | 1,1-Bis[4-(4-amonophenoxy)-phenyl]-4-n-pentylcyclohexane | 122 | 14 |

TABLE 1-continued

EXAMPLE 5

(First step)

4-(Trans-4-n-propylcyclohexyl)cyclohexanone (449 g), phenol (756 g) and CaCl (446 g) were mixed, followed by gradually dropwise adding conc. hydrochloric acid (335 ml) with vigorous stirring at room temperature, further agitating the mixture for 30 minutes after completion of the dropwise addition, allowing the resulting material to stand at room temperature, further for 50 hours, adding hot water (2 l) and toluene (3 l), heating the mixture, cooling, filtering off crystals, washing the crystals with water and then with toluene, drying the crystals and recrystallizing from tetrahydrofuran solvent to obtain white crystals of 1,1-bis(4-hydroxyphenyl)-4-(trans-4-n-propylcyclohexyl)cyclohexane as a diol compound of the present invention (436 g). M.P.: 222.0°–222.8° C.

(Second step)

DMSO (300 ml) and KOH (38.0 g) were added to 1,1-bis(4-hydroxyphenyl)-4-(trans-4-n-propylcyclohexyl)cyclohexane (110.6 g) obtained in the first step, followed by dissolving these together on heating to 65° C., dropwise adding to the solution, a solution of p-chloronitrobenzene (97.8 g) in DMSO (500 ml) at 65° C., reacting the mixture, aging for 5 hours, cooling down to room temperature after completion of the reaction, extracting with dichloromethane, washing with 1N-NaOH aqueous solution and further with saturated NaCl aqueous solution till the aqueous solution became neutral, drying over MgSO$_4$, treating by alumina column, distilling off the resulting eluate and recrystallizing the resulting concentrate from a mixed solvent of toluene-acetone to obtain pale yellow crystals of 1,1-bis[4-(4-nitrophenoxy)phenyl]-4-(trans-4-n-propylcyclohexyl)cyclohexane (136.1 g).

M.P.: 164.4°–165.5° C.

(Third step)

1,1-Bis[4-(4-nitrophenoxy)phenyl]-4-(trans-4-n-propylcyclohexyl)cyclohexane (81.1 g) obtained in the second step was dissolved in a mixed solvent of toluene (400 ml) with a mixed solution of ethanol with methanol (87:13) [Solmix made by Nihon Kasei Co., Ltd.) (150 ml), followed by adding a Pd-C catalyst (5% product; water content 55.9%) (5.0 g), contacting the mixture with hydrogen gas with stirring at 60° C. under the atmospheric pressure, filtering off the catalyst after completion of the reaction, concentrating the solution and recrystallizing the concentrate from a mixed solvent of dichloromethane with Solmix to obtain a pale brown color 1,1-bis[4-(4-aminophenoxy)phenyl]-4-(trans-4-n-propylcyclohexyl)cyclohexane (59.4 g) as a diamino compound of the present invention.

M.P.: 148.3°–149.8° C.

Its 90 MHz proton NMR spectra (hereinafter abbreviated to 90 MHz 1H-NMR) are shown in FIG. 1.

EXAMPLE 6

Example 5 was repeated except that 4-(trans-4-n-propylcyclohexyl)cyclohexanone was replaced by cyclohexylcyclohexanone.

At the first step, 1,1-bis(4-hydroxyphenyl)-4-cyclohexylcyclohexane in the form of white crystals was obtained.
M.P.: 213.1°–213.7° C.

At the second step, 1,1-bis[4-(4-nitrophenoxy)phenyl]-4-cyclohexylcyclohexane in the form of pale yellow crystals was obtained.
M.P.: 159.1°–159.8° C.

At the third step, a diamino compound, 1,1-bis[4-(4-aminophenoxy)phenyl]-4-cyclohexylcyclohexane in the form of pale brown crystals was obtained.
M.P.: 176.1°–176.8° C.

Figure 2:
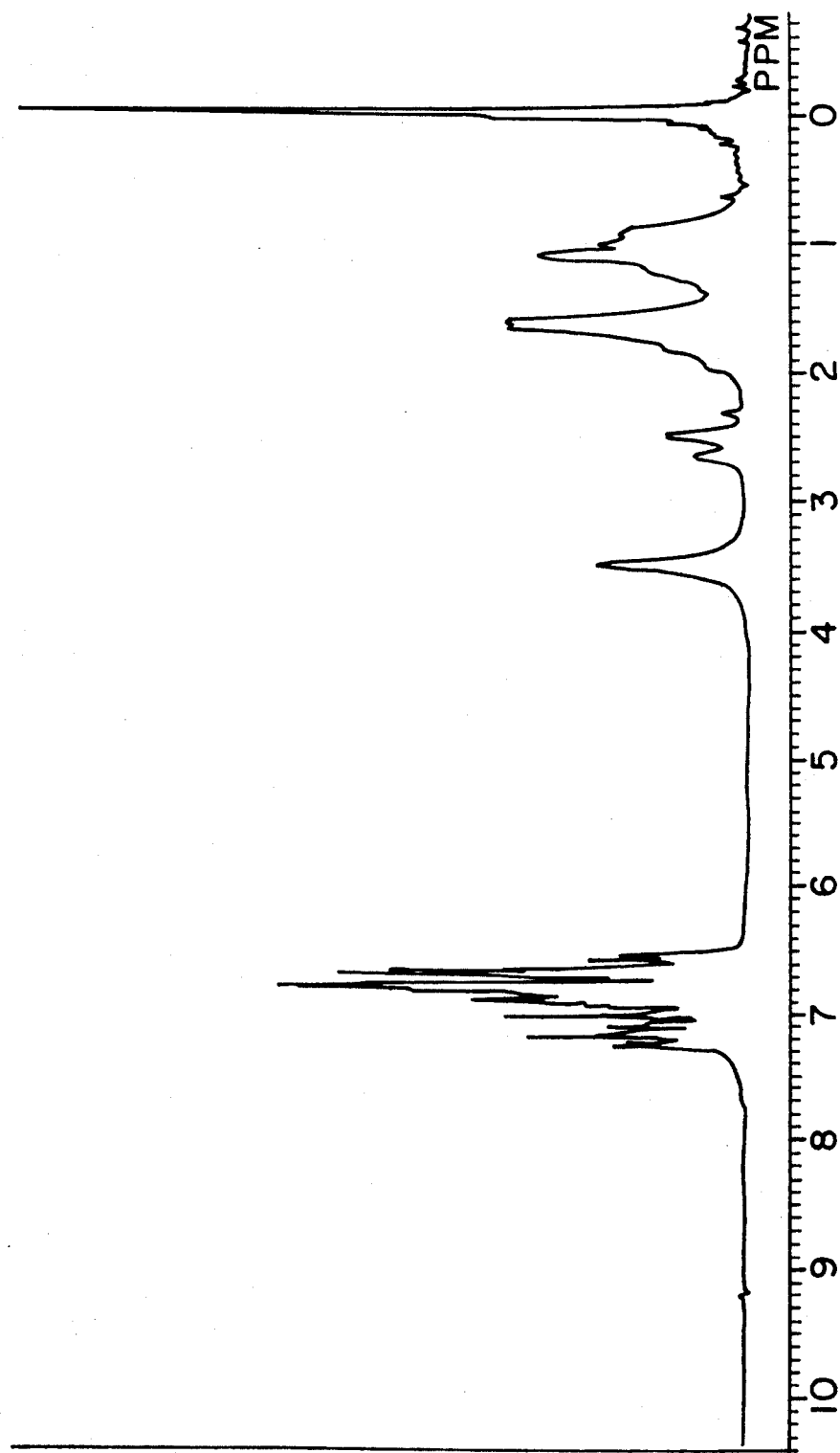

The 90 MHz $^1$H-NMR spectra of the resulting diamino compound are shown in FIG. 2.

EXAMPLE 7

Example 5 was repeated except that 4-(trans-4-n-propylcyclohexyl)cyclohexanone was replaced by 4-(trans-4-n-pentylcyclohexyl)cyclohexanone.

At the first step, 1,1-bis(4-hydroxyphenyl)-4-(trans-4-n-pentylcyclohexyl)cyclohexane in the form of white crystals was obtained.
M.P.: 208.4–209.3° C.

At the second step, 1,1-bis[4-(4-nitrophenoxy)phenyl]-4-(trans-4-n-pentylcyclohexyl)cyclohexane in the form of pale yellow crystals was obtained.
M.P.: 144.9°–146.9° C.

At the third step, 1,1-bis[4-(4-aminophenoxy)phenyl]-4-(trans-4-n-pentylcyclohexyl)cyclohexane in the form of pale brown crystals as a diamino compound of the present invention was obtained.
M.P.: 145.5°–146.5° C.

Figure 3:
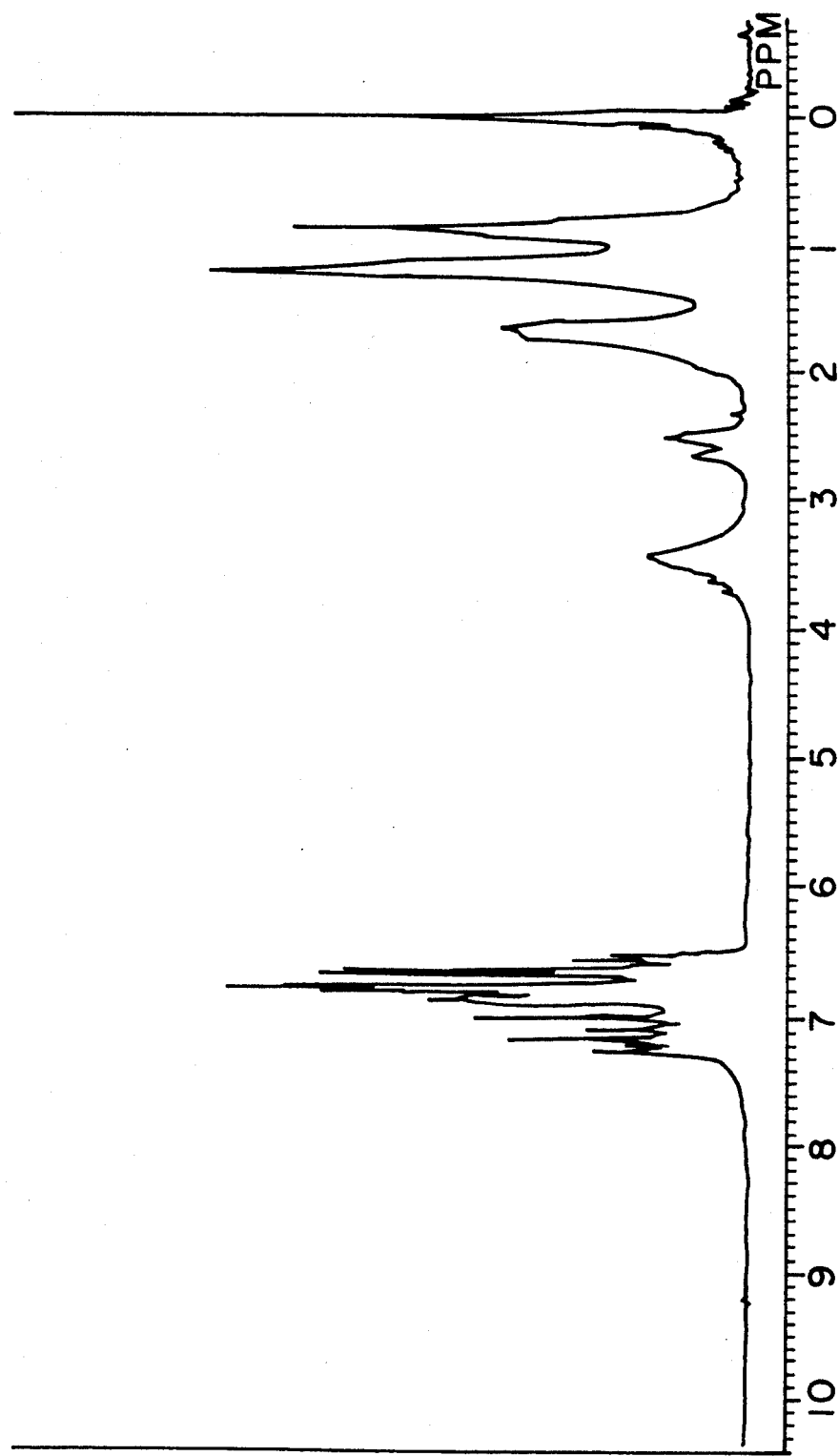

The 90 MHz $^1$H-NMR spectra of the resulting diamino compound are shown in FIG. 3.

EXAMPLE 8

1,1-Bis[4-(4-aminophenoxy)phenyl]-4-(trans-4-n-propylcyclohexyl)cyclohexane (6.54 g) obtained in Example 5, pyromellitic anhydride (2.84 g) and p-aminophenyltrimethoxysilane (0.62 g) were polymerized in a mixed solvent of N-methyl-2-pyrrolidone (81.00 g) with butyl cellosolve (9.00 g) at 5° to 10° C. to obtain a polyamic acid solution (10%, $\eta_{20}$=163 cp), followed by diluting this solution with N-methyl-2-pyrrolidone (twice quantity) and butyl cellosolve (twice quantity), coating the resulting solution onto a glass substrate provided with a transparent electrode on its one surface according to a rotation-coating method (spinner method) under coating conditions of 2,000 rpm and 20 seconds, subjecting the resulting material to preliminary heating at 100° C. for 10 minutes, heat-treating the resulting material at 200° C. for one hour to obtain a polyimide coating having a coating thickness of 400 Å, subjecting the respective coated surfaces of two substrates to rubbing treatment, constructing a liquid crystal cell having a cell thickness of 20 μm so that the respective rubbing directions might be parallel and the substrate surfaces might be opposed to each other, sealing a liquid crystal ZLI-1132 prepared by Merck Co., Ltd. in the cell, and subjecting the liquid crystal to heat treatment at 130° C. for 30 minutes. The resulting liquid crystal element exhibited a good alignment, and the pretilt angle sought according to crystal rotation method was 14°.

EXAMPLE 9

A 10% by weight polyamic acid solution was prepared using 1,1-bis[4-(4-aminophenoxy)phenyl]-4-cyclohexylcyclohexane prepared in Example 6 and in the same manner as in Example 8 exhibited a viscosity of 150 cp, and the pretilt angle of a liquid crystal element prepared therefrom was 9°.

EXAMPLE 10

A 10% by weight polyamic acid solution prepared using 1,1-bis[4-(4-aminophenoxy)phenyl]-4-(trans-4-n-pentylcyclohexyl)cyclohexane, prepared in Example 7 and obtained in the same manner as in Example 8 exhibited a viscosity of 140 cp, and the pretilt angle of a liquid crystal element prepared therefrom was 14° or more (no correct value was obtained due to exceeding the measurement limit according to crystal rotation method).

COMPARATIVE EXAMPLE 1

2,2-Bis[4-(4-aminophenoxy)phenyl]propane (2.16 g, 5.27 mmol) was dissolved in N-methyl-2-pyrrolidone (61 ml) with stirring, followed by cooling the solution down to 5° C. in ice bath, at a time feeding pyromellitic dianhydride (1.15 g, 5.27 mmol), and reacting the mixture with stirring and under cooling for 2 hours, to obtain a transparent 6.67% by weight polyamic acid solution consisting of 2,2-bis[4-(4-aminophenoxy)phenyl]propane and pyromellitic dianhydride in a molar ratio of 1:1. The viscosity at 25° C. of this solution was 203 cp. This solution was diluted with butyl cellosolve into a 2.5% by weight polyamic acid solution, followed by preparing a polyether imide high molecular coating having a coating thickness of about 1,000 Å in the same manner as in Example 1 to obtain a liquid crystal element. This element exhibited a superior alignment, and the resulting pretilt angle was 5°.

COMPARATIVE EXAMPLE 2

2,2-Bis[4-(4-aminophenoxy)phenyl]propane (24.92 g), pyromellitic anhydride (15.16 g) and p-aminophenyltrimethoxysilane (3.36 g) were polymerized in a solvent, N-methyl-2-pyrrolidone (380.3 ml) at 5° to 10° C. to obtain a polyamic acid solution, (10%, $\eta_{20}$=113 cp). This solution was diluted with a mixed solvent of N-methyl-2-pyrrolidone (1 part) with butyl cellosolve (1 part) into a 3% by weight solution, followed by coating according to a rotation coating process (spinner process) under coating conditions of 3,000 r.p.m. and 20 seconds, thereafter carrying out preliminary heating at 100° C. for 10 minutes, carrying out heat treatment at 200° C. for one hour to obtain a polyimide coating having a coating thickness of about 600 Å and subjecting it to rubbing treatment to obtain a liquid crystal cell. A liquid crystal element composed thereof had a pretilt angle of 5° as sought from measurement of its electric capacity.

As seen from the above results, when 1,1-bis[4-(4-aminophenoxy)phenyl]-4-(trans-4-n-propylcyclohexyl)cyclohexyl)cyclohexane is used as a raw material for the aligning coating, it is possible to obtain a large pretilt angle.

Further, when the chain length of the alkyl chain bound to the cyclohexylcyclohexane in the raw material is elongated, it is possible to increase the pretilt angle, and also when a suitable chian length is chosen, it is possible to obtain the optimum pretilt angle required when the liquid cristal element is prepared.

The liquid crystal-aligning coating has a large pretilt angle. Since such a large pretilt angle is easily obtained by subjecting the coating of the polyether imide high molecule having a structural unit of the formula (2) to rubbing treatment, it is suitable for producing a liquid crystal element on a commercial scale. Further, when the alkyl chain length of $R_1$ to $R_6$ in the formula (2) is varied, it is possible to vary the pretilt angle to 7° to vertical angle.

When the liquid crystal-aligning coating of the present invention is used, it is possible to realize a liquid crystal display of STN mode having a good display quality.

The diamino compound of the present invention and the dinitro compound and the diol compound as its intermediates are novel compounds which have so far been not existent.

The polyimide compound prepared using the diamino compound as its raw material can realize a large pretilt angle required for STN liquid crystal display element, by usual rubbing treatment. The above fact is presumed to be brought about by the cyclohexane ring and an alkyl group bound thereto of the diamino compound as its raw material. The diamino compound of the present invention having such characteristics has been designed mainly in order to give an intermediate as a raw material for an organic aligning coating for STN, but the compound is usable for preparing high molecular compounds such as other polyimides, polyamides and modifying these and also usable for other objects such as epoxy cross-linking material, etc., and further, it is possible to introduce new characteristics into high molecular compound.

What we claim is:

1. A liquid crystal-aligning coating, comprising a polyimide having a structural unit expressed by the formula

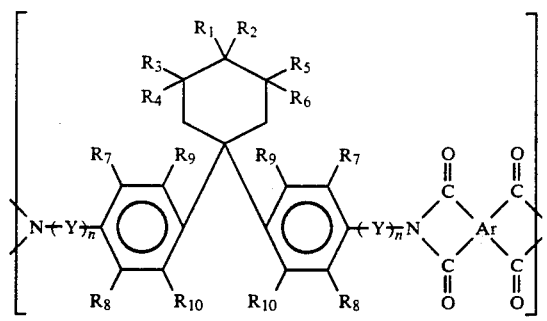

wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, Y represents

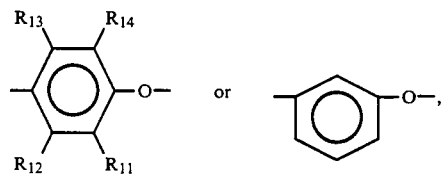

n represents 0 or 1, $R_3$ to $R_{14}$ each represent a hydrogen atom, and Ar represents a tetravalent aromatic group.

2. A liquid crystal-aligning coating according to claim 1, produced by a process comprising the steps of mixing a tetracarboxylic acid dianhydride expressed by the following formula (3) with a diamino compound expressed by the following formula (4), (5) or (6) in a solvent, followed by reacting the both to form a polyamic acid and heating said polyamic acid;

(3)

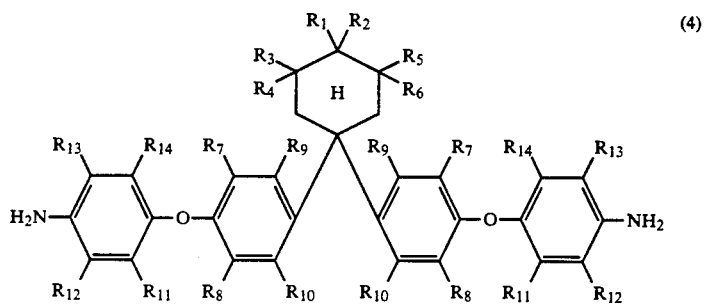

(4)

-continued

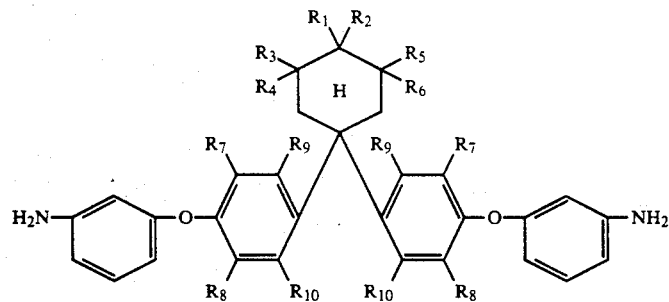
(5)

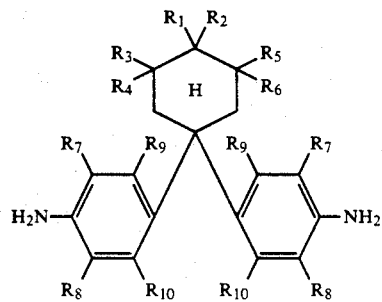
(6)

wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, and Ar represents a tetravalent aromatic group.

3. A liquid crystal-aligning coating, comprising a polyimide having a structural unit expressed by the formula

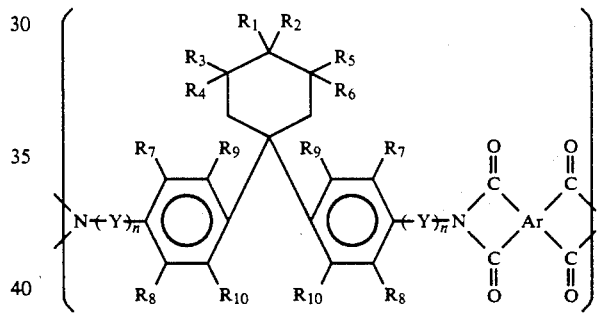
(7)

produced by a process comprising the steps of mixing a tetracarboxylic acid dianhydride expressed by the following formula (3) with a diamine compound expressed by the following formula (4), (5) or (6) in a solvent, followed by reacting the both to form a polyamic acid and heating said polyamic acid together with a silicon compound expressed by the following formula (7):

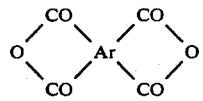
(3)

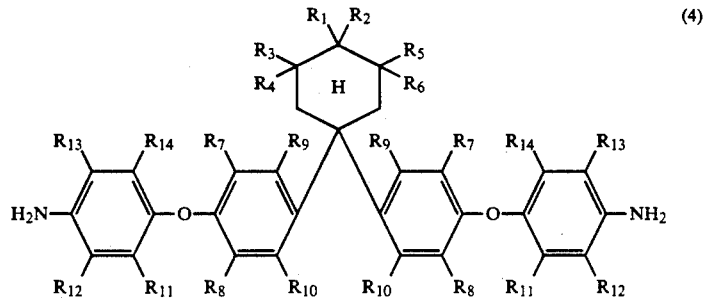
(4)

-continued

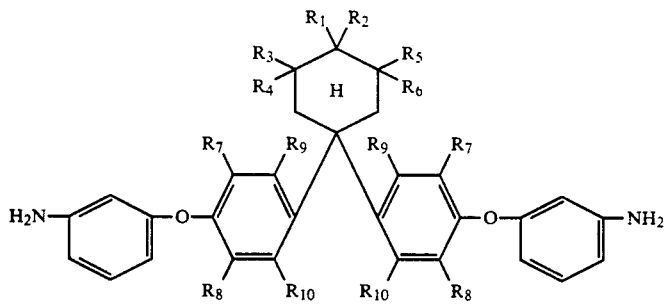

(5)

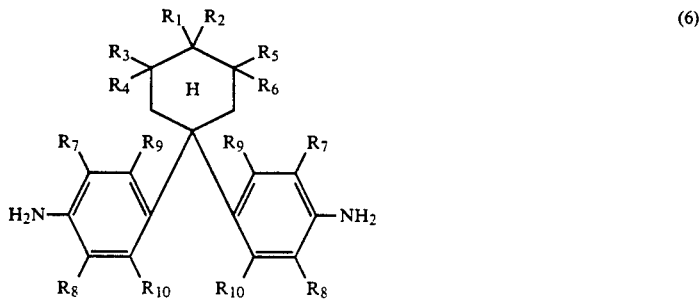

(6)

wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, $R_3$ to $R_{14}$ each represent a hydrogen atom, Ar represents a tetravalent aromatic group, Y represents

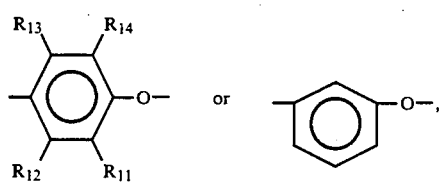

n represents 0 or 1, Z represents an alkylene group of 2 to 10 carbon atoms or a phenylene group, and $R_{15}$ represents an alkyl group of 1 to 10 carbon atoms.

4. A liquid crystal-aligning coating according to claim 1, composed mainly of a polyether polyimide having a structural unit expressed by the formula

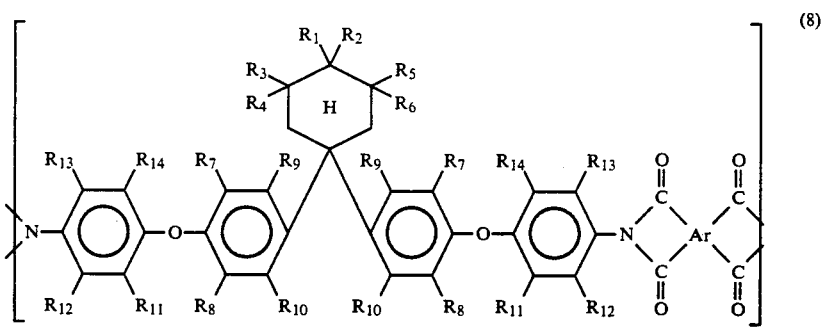

(8)

wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, $R_3$ to $R_{14}$ each represent a hydrogen atom, and Ar represents a tetravalent aromatic group.

5. A liquid crystal-aligning coating according to claim 4, further comprising a substituted imido group expressed by the formula

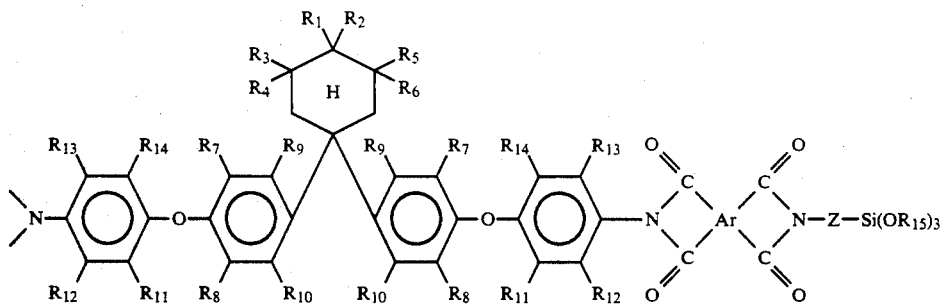

wherein Z represents an alkylene group of 2 to 10 carbon atoms or a phenylene group, and $R_{15}$ represents an alkyl group of 1 to 10 carbon atoms.

6. A liquid crystal-aligning coating according to claim 1, composed mainly of a polyether polyimide having a structural unit expressed by the formula

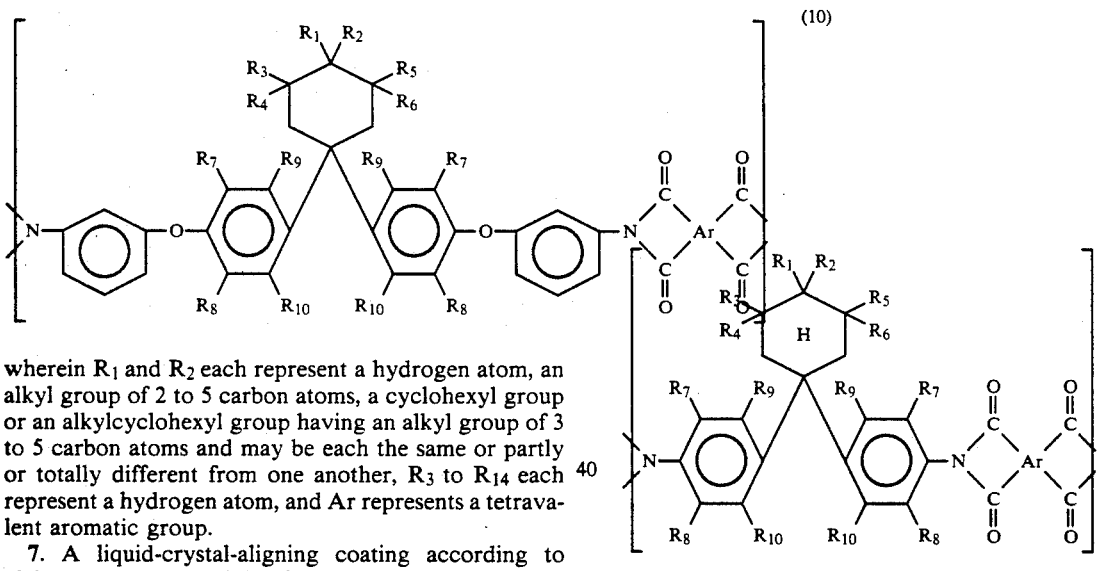

wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, $R_3$ to $R_{14}$ each represent a hydrogen atom, and Ar represents a tetravalent aromatic group.

7. A liquid-crystal-aligning coating according to claim 1, composed mainly of a polyimide having a structural unit expressed by the formula wherein $R_1$ and $R_2$ each represent a hydrogen atom, an alkyl group of 2 to 5 carbon atoms, a cyclohexyl group or an alkylcyclohexyl group having an alkyl group of 3 to 5 carbon atoms and may be each the same or partly or totally different from one another, $R_3$ to $R_6$ each represent a hydrogen atom, and Ar represents a tetravalent aromatic group.

8. A liquid crystal-aligning coating according to claim 7, further comprising a substituted imino group expressed by the formula

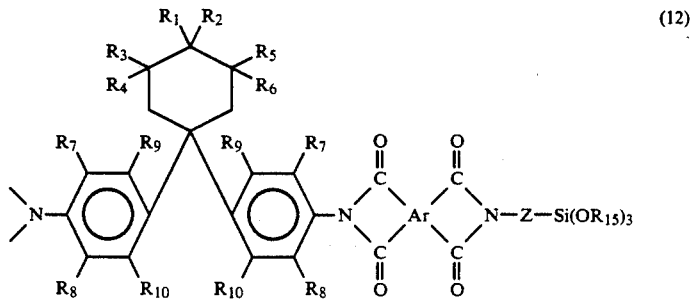

wherein Z represents an alkylene group of 2 t 4 carbon atoms or a phenylene group, and $R_{15}$ represents an alkyl group of 1 to 3 carbon atoms.

9. A liquid crystal display element comprising the liquid crystal-aligning coating of claim 1.

10. A diamino compound expressed by the formula

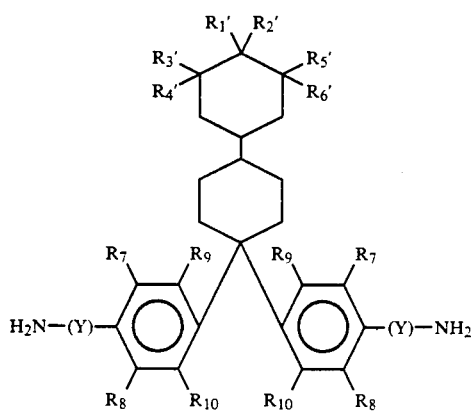

(I)

wherein $R'_1$ to $R'_2$ each represent a hydrogen atom or an alkyl group of 2 to 5 carbon atoms, $R'_3$ to $R'_6$ each represent a hydrogen atom, Y represents

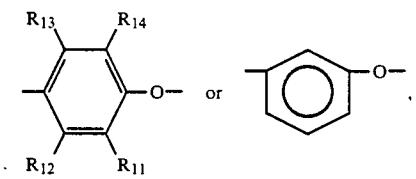

and $R_7$ to $R_{14}$ each represent a hydrogen atom.

11. A dinitro compound expressed by the formula

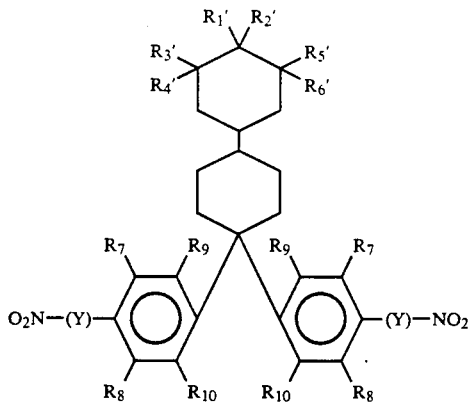

(II)

wherein $R'_1$ to $R'_2$ each represent a hydrogen atom or an alkyl group of 2 to 5 carbon atoms, $R'_3$ to $R'_6$ each represent a hydrogen atom, Y represents

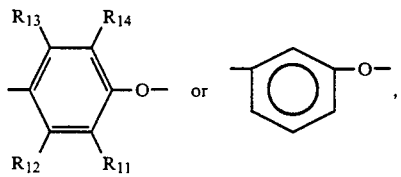

and $R_7$ to $R_{14}$ each represent a hydrogen atom.

12. A diol compound expressed by the formula

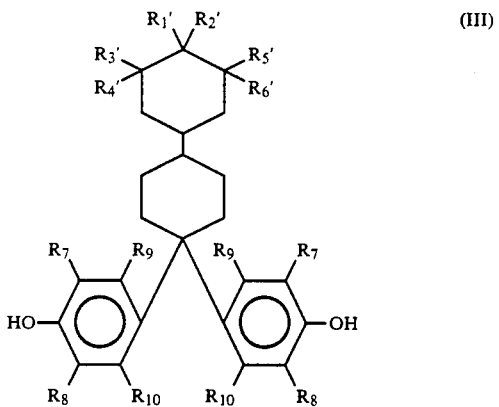

(III)

wherein $R'_1$ to $R'_2$ each represent a hydrogen atom or an alkyl group of 2 to 5 carbon atoms, and $R'_3$ to $R'_6$ and $R_7$ to $R_{14}$ each represent a hydrogen atom.

* * * * *